US011832334B2

United States Patent
Nam et al.

(10) Patent No.: US 11,832,334 B2
(45) Date of Patent: Nov. 28, 2023

(54) SEMI-INDEPENDENT DISCONTINUOUS RECEPTION GROUPS

(71) Applicant: QUALCOMM Incorporated, San Diego, CA (US)

(72) Inventors: Wooseok Nam, San Diego, CA (US); Linhai He, San Diego, CA (US); Tao Luo, San Diego, CA (US); Peter Pui Lok Ang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/203,575

(22) Filed: Mar. 16, 2021

(65) Prior Publication Data

US 2021/0298114 A1    Sep. 23, 2021

Related U.S. Application Data

(60) Provisional application No. 62/992,885, filed on Mar. 20, 2020.

(51) Int. Cl.
*H04W 76/28*    (2018.01)
*H04W 74/08*    (2009.01)
(Continued)

(52) U.S. Cl.
CPC ............. *H04W 76/28* (2018.02); *H04L 5/001* (2013.01); *H04W 72/0453* (2013.01);
(Continued)

(58) Field of Classification Search
CPC ............... H04W 76/28; H04W 72/042; H04W 72/0453; H04W 72/1284; H04W 74/0833;
(Continued)

(56) References Cited

U.S. PATENT DOCUMENTS

| 2010/0130237 A1* | 5/2010 | Kitazoe | H04W 76/28 455/458 |
| 2011/0002281 A1 | 1/2011 | Terry et al. | |

(Continued)

FOREIGN PATENT DOCUMENTS

WO    WO-2020088612 A1 *    5/2020    ............. H04L 5/001

OTHER PUBLICATIONS

Kuang et al., "Radio Communication Method and Terminal Device", May 7, 2020, WO, English language translation of WO 2020088612 (Year: 2020).*

(Continued)

*Primary Examiner* — Michael K Phillips
(74) *Attorney, Agent, or Firm* — Holland & Hart LLP

(57) ABSTRACT

Methods, systems, and devices for wireless communications are described. A semi-independent discontinuous reception (DRX) group configuration for a user equipment (UE) configured to communicate on at least a primary DRX group (PDG) and a secondary DRX group (SDG). The UE and a base station may implement a DRX coupling rule to ensure the PDG is in an active mode when the SDG is in an active mode. In some examples, the PDG, the SDG, or both may be configured for DRX long cycles, DRX short cycles, or both. The UE may determine active or inactive mode timers of each semi-independent DRX group. In some cases, the UE may trigger or extend an active mode of the PDG when an SDG active mode is triggered. Additionally, the UE may end an active mode of the SDG when an active mode of the PDG expires.

30 Claims, 20 Drawing Sheets

(51) Int. Cl.
   *H04W 80/02*      (2009.01)
   *H04L 5/00*       (2006.01)
   *H04W 72/0453*    (2023.01)
   *H04W 72/21*      (2023.01)
   *H04W 72/23*      (2023.01)

(52) U.S. Cl.
   CPC ........... *H04W 72/21* (2023.01); *H04W 72/23* (2023.01); *H04W 74/0833* (2013.01); *H04W 80/02* (2013.01)

(58) Field of Classification Search
   CPC . H04W 80/02; H04W 76/15; H04W 52/0216; H04W 52/0219; H04W 52/0229; H04W 52/028; H04L 5/001; H04L 5/0053; G06F 1/3209; G06F 1/3287; Y02D 10/00; Y02D 30/70
   See application file for complete search history.

(56) References Cited

U.S. PATENT DOCUMENTS

| | | | | |
|---|---|---|---|---|
| 2011/0170420 | A1* | 7/2011 | Xi | H04L 5/001 370/328 |
| 2011/0292854 | A1* | 12/2011 | Terry | H04L 5/001 370/329 |
| 2012/0120815 | A1* | 5/2012 | Anderson | H04W 76/28 370/252 |
| 2013/0163497 | A1* | 6/2013 | Wei | H04W 76/38 370/311 |
| 2015/0124743 | A1* | 5/2015 | Damnjanovic | H04L 5/0032 370/329 |
| 2015/0319690 | A1* | 11/2015 | Wei | H04W 72/0453 370/311 |
| 2019/0103954 | A1 | 4/2019 | Lee et al. | |
| 2019/0373668 | A1 | 12/2019 | Wang et al. | |
| 2020/0078909 | A1 | 3/2020 | Park et al. | |
| 2022/0095230 | A1* | 3/2022 | Shi | H04W 52/0219 |
| 2022/0191793 | A1* | 6/2022 | Murray | H04W 72/23 |
| 2022/0264696 | A1* | 8/2022 | Bao | H04W 52/0229 |

OTHER PUBLICATIONS

International Search Report and Written Opinion—PCT/US2021/022818—ISA/EPO—dated Jul. 13, 2021.

* cited by examiner

SEMI-INDEPENDENT DISCONTINUOUS RECEPTION GROUPS

CROSS REFERENCE

The present Application for Patent claims the benefit of U.S. Provisional Patent Application No. 62/992,885 by NAM et al., entitled "SEMI-INDEPENDENT DISCONTINUOUS RECEPTION GROUPS," filed Mar. 20, 2020, assigned to the assignee hereof, and expressly incorporated by reference herein.

FIELD OF TECHNOLOGY

The following relates generally to wireless communications and more specifically to discontinuous reception (DRX) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may enter a discontinuous reception (DRX) mode to conserve power usage at the UE. When a UE operates in a DRX mode, the UE may transition between an active mode and an inactive mode in a DRX cycle. When the UE is in an active DRX duration, the UE may be configured to transmit and receive information, and when the UE is in an inactive DRX duration, the UE may refrain from monitoring for signals from a base station and may also refrain from transmitting or receiving some types of information. In some examples, a base station may also enter a DRX mode to conserve power usage at the base station. Additionally, a DRX mode may include multiple DRX groups configured at different frequency ranges. Accordingly, efficient techniques are desired to accommodate multiple DRX groups (e.g., multiple DRX configurations) in a wireless communications system.

SUMMARY

The described techniques relate to improved methods, systems, devices, and apparatuses that support semi-independent discontinuous reception (DRX) groups. Generally, the described techniques provide for a semi-independent DRX group configuration for a user equipment (UE) configured to communicate on at least a primary DRX group (PDG) and a secondary DRX group (SDG) (e.g., semi-independent DRX groups). The UE and a base station may implement a DRX coupling rule to ensure the PDG is in an active mode when the SDG is in an active mode. In some examples, the PDG, the SDG, or both may be configured for DRX long cycles, DRX short cycles, or both. The UE may determine active or inactive mode timers of each semi-independent DRX group. In some cases, the UE may trigger or extend an active mode of the PDG when an SDG active mode is triggered. Additionally, the UE may end an active mode of the SDG when an active mode of the PDG expires.

A method of wireless communications at a UE is described. The method may include receiving a first DRX configuration associated with a first DRX operation for carrier aggregation (CA) communications with a base station over a primary group of component carriers (CCs), receiving a second DRX configuration associated with a second DRX operation for the CA communications with the base station over a secondary group of CCs, and operating the UE in the first DRX operation and in the second DRX operation in accordance with a DRX coupling rule by which a first active state of the first DRX operation is determined based on a second active state of the second DRX operation, the second active state is determined based on the first active state, or both.

An apparatus for wireless communications at a UE is described. The apparatus may include a processor, memory coupled with the processor, and instructions stored in the memory. The instructions may be executable by the processor to cause the apparatus to receive a first DRX configuration associated with a first DRX operation for CA communications with a base station over a primary group of CCs, to receive a second DRX configuration associated with a second DRX operation for the CA communications with the base station over a secondary group of CCs, and to operate the UE in the first DRX operation and in the second DRX operation in accordance with a DRX coupling rule by which a first active state of the first DRX operation is determined based on a second active state of the second DRX operation, the second active state is determined based on the first active state, or both.

Another apparatus for wireless communications at a UE is described. The apparatus may include means for receiving a first DRX configuration associated with a first DRX operation for CA communications with a base station over a primary group of CCs, means for receiving a second DRX configuration associated with a second DRX operation for the CA communications with the base station over a secondary group of CCs, and means for operating the UE in the first DRX operation and in the second DRX operation in accordance with a DRX coupling rule by which a first active state of the first DRX operation is determined based on a second active state of the second DRX operation, the second active state is determined based on the first active state, or both.

A non-transitory computer-readable medium storing code for wireless communications at a UE is described. The code may include instructions executable by a processor to receive a first DRX configuration associated with a first DRX operation for CA communications with a base station over a primary group of CCs, to receive a second DRX configuration associated with a second DRX operation for the CA communications with the base station over a secondary group of CCs, and to operate the UE in the first DRX operation and in the second DRX operation in accordance with a DRX coupling rule by which a first active state of the first DRX operation is determined based on a second active state of the second DRX operation, the second active state is determined based on the first active state, or both.

Some examples of the method, apparatuses, and non-transitory computer-readable medium described herein may further include operations, features, means, or instructions for receiving, from the base station on one or more CCs of the secondary group, a downlink signal during the second active state of the second DRX operation; and for determining to start or restart a first inactivity timer for the primary group and a second inactivity timer for the secondary group based on receiving the downlink signal on the one or more CCs of the secondary group in accordance with the DRX coupling rule.

In some examples of the method, apparatuses, and non-transitory computer-readable medium described herein, the downlink signal may include a physical downlink control channel (PDCCH) that indicates a new data transmission over a downlink or uplink shared channel.

Some examples of the method, apparatuses, and non-transitory computer-readable medium described herein may further include operations, features, means, or instructions for receiving, from the base station on one or more CCs of the primary group, a downlink signal during the first active state of the first DRX operation; and for determining to start or restart a first inactivity timer for the primary group based on receiving the downlink signal on the one or more CCs of the primary group, where a second inactivity timer for the secondary group is not started or restarted after the downlink signal is received on the one or more CCs of the primary group.

In some examples of the method, apparatuses, and non-transitory computer-readable medium described herein, the downlink signal may include a PDCCH that indicates a new data transmission over a downlink or uplink shared channel.

In some examples of the method, apparatuses, and non-transitory computer-readable medium described herein, the DRX coupling rule may include operations, features, means, or instructions for determining that a timer associated with the first active state, the second active state, or both is running for each of the primary group and the secondary group, where the first active state is maintained based on the timer running for each of the primary group and the secondary group.

Some examples of the method, apparatuses, and non-transitory computer-readable medium described herein may further include operations, features, means, or instructions for determining that the first active state is maintained based on the timer for the second active state is running, where the timer for the first active state is not running at a same instance as the timer for the second active state is running; for refraining from monitoring for a downlink signal on the primary group based on the determination that the first active state is maintained based on the timer for the second active state is running while the timer for the first active state is not running; and for transmitting an uplink signal on the primary group based on the determination that the first active state is maintained based on the timer for the second active state is running while the timer for the first active state is not running.

In some examples of the method, apparatuses, and non-transitory computer-readable medium described herein, the timer associated with the first active state, the second active state, or both may include an on duration timer, an inactivity timer, a downlink retransmission timer, an uplink retransmission timer, a contention resolution timer, or a combination thereof.

Some examples of the method, apparatuses, and non-transitory computer-readable medium described herein may further include operations, features, means, or instructions for transmitting, to the base station, a scheduling request in an uplink control channel; and for determining to maintain the first active state during a pending duration for the scheduling request, the pending duration including a duration where the UE is waiting for a downlink control channel from the base station in response to the scheduling request.

In some examples of the method, apparatuses, and non-transitory computer-readable medium described herein, the scheduling request may be transmitted on one or more CCs of the primary group, one or more CCs of the secondary group, or a combination thereof.

Some examples of the method, apparatuses, and non-transitory computer-readable medium described herein may further include operations, features, means, or instructions for determining a downlink control channel indicating a transmission addressed to a cell radio network temporary identifier (C-RNTI) of a media access control (MAC) entity of the UE has not been received on the CCs of the primary group or the secondary group, where the first active state is maintained based on the downlink control channel not being received.

In some examples of the method, apparatuses, and non-transitory computer-readable medium described herein, the downlink control channel may be expected to be received after receiving a random access response message as part of a random access procedure.

Some examples of the method, apparatuses, and non-transitory computer-readable medium described herein may further include operations, features, means, or instructions for determining the first active state of the first DRX operation has expired and for stopping the second active state of the second DRX operation based on the first active state expiring.

Some examples of the method, apparatuses, and non-transitory computer-readable medium described herein may further include operations, features, means, or instructions for determining the first DRX configuration, the second DRX configuration, or both include DRX short cycles for the first DRX operation, the second DRX operation, or both.

In some examples of the method, apparatuses, and non-transitory computer-readable medium described herein, the first active state for the first DRX operation associated with the DRX short cycles may be independent of the second active state for the second DRX operation associated with the DRX short cycles.

In some examples of the method, apparatuses, and non-transitory computer-readable medium described herein, a configuration of DRX short cycles for the second DRX operation may be ignored or prohibited.

In some examples of the method, apparatuses, and non-transitory computer-readable medium described herein, the first DRX configuration, the second DRX configuration, or both may be received via higher layer signaling.

Some examples of the method, apparatuses, and non-transitory computer-readable medium described herein may further include operations, features, means, or instructions for receiving, via higher layer signaling, an indication of the CCs to be included the primary group, the CCs to be included the secondary group, or a combination thereof.

In some examples of the method, apparatuses, and non-transitory computer-readable medium described herein, the primary group may include a PDG, and the secondary group may include an SDG.

In some examples of the method, apparatuses, and non-transitory computer-readable medium described herein, the first DRX configuration, the second DRX configuration, or both include a connected mode DRX configuration defined per MAC entity across the CCs of the primary group and the CCs of the secondary group for the CA communications.

In some examples of the method, apparatuses, and non-transitory computer-readable medium described herein, the CCs of the primary group and the CCs of the secondary group may be in a same or different frequency range, may have a same or different numerology, or a combination thereof.

A method of wireless communications at a base station is described. The method may include transmitting a first DRX configuration associated with a first DRX operation for CA communications with a UE over a primary group of CCs, transmitting a second DRX configuration associated with a second DRX operation for CA communications with the UE over a secondary group of CCs, and operating the base station in the first DRX operation and in the second DRX operation in accordance with a DRX coupling rule by which a first active state of the first DRX operation is determined based on a second active state of the second DRX operation, the second active state is determined based on the first active state, or both.

An apparatus for wireless communications at a base station is described. The apparatus may include a processor, memory coupled with the processor, and instructions stored in the memory. The instructions may be executable by the processor to cause the apparatus to transmit a first DRX configuration associated with a first DRX operation for CA communications with a UE over a primary group of CCs, to transmit a second DRX configuration associated with a second DRX operation for CA communications with the UE over a secondary group of CCs, and to operate the base station in the first DRX operation and in the second DRX operation in accordance with a DRX coupling rule by which a first active state of the first DRX operation is determined based on a second active state of the second DRX operation, the second active state is determined based on the first active state, or both.

Another apparatus for wireless communications at a base station is described. The apparatus may include means for transmitting a first DRX configuration associated with a first DRX operation for CA communications with a UE over a primary group of CCs, means for transmitting a second DRX configuration associated with a second DRX operation for CA communications with the UE over a secondary group of CCs, and means for operating the base station in the first DRX operation and in the second DRX operation in accordance with a DRX coupling rule by which a first active state of the first DRX operation is determined based on a second active state of the second DRX operation, the second active state is determined based on the first active state, or both.

A non-transitory computer-readable medium storing code for wireless communications at a base station is described. The code may include instructions executable by a processor to transmit a first DRX configuration associated with a first DRX operation for CA communications with a UE over a primary group of CCs, to transmit a second DRX configuration associated with a second DRX operation for CA communications with the UE over a secondary group of CCs, and to operate the base station in the first DRX operation and in the second DRX operation in accordance with a DRX coupling rule by which a first active state of the first DRX operation is determined based on a second active state of the second DRX operation, the second active state is determined based on the first active state, or both.

Some examples of the method, apparatuses, and non-transitory computer-readable medium described herein may further include operations, features, means, or instructions for transmitting, to the UE on one or more CCs of the secondary group, a downlink signal during the second active state of the second DRX operation; and for determining to start or restart a first inactivity timer for the primary group and a second inactivity timer for the secondary group based on transmitting the downlink signal on the one or more CCs of the secondary group in accordance with the DRX coupling rule.

In some examples of the method, apparatuses, and non-transitory computer-readable medium described herein, the downlink signal may include a PDCCH that indicates a new data transmission over a downlink or uplink shared channel.

Some examples of the method, apparatuses, and non-transitory computer-readable medium described herein may further include operations, features, means, or instructions for transmitting, to the UE on one or more CCs of the primary group, a downlink signal during the first active state of the first DRX operation; and for determining to start or restart a first inactivity timer for the primary group based on transmitting the downlink signal on the one or more CCs of the primary group, where a second inactivity timer for the secondary group is not started or restarted after the downlink signal is received on the one or more CCs of the primary group.

In some examples of the method, apparatuses, and non-transitory computer-readable medium described herein, the downlink signal may include a PDCCH that indicates a new data transmission over a downlink or uplink shared channel.

In some examples of the method, apparatuses, and non-transitory computer-readable medium described herein, the DRX coupling rule may include operations, features, means, or instructions for determining that a timer associated with the first active state, the second active state, or both is running for each of the primary group and the secondary group, where the first active state is maintained based on the timer running for each of the primary group and the secondary group.

In some examples of the method, apparatuses, and non-transitory computer-readable medium described herein, the timer associated with the first active state, the second active state, or both may include an on duration timer, an inactivity timer, a downlink retransmission timer, an uplink retransmission timer, a contention resolution timer, or a combination thereof.

Some examples of the method, apparatuses, and non-transitory computer-readable medium described herein may further include operations, features, means, or instructions for receiving, from the UE, a scheduling request in an uplink control channel; and for determining to maintain the first active state during a pending duration for the scheduling request, the pending duration including a duration where the UE is waiting for a downlink control channel from the base station in response to the scheduling request.

In some examples of the method, apparatuses, and non-transitory computer-readable medium described herein, the scheduling request may be received on one or more CCs of the primary group, one or more CCs of the secondary group, or a combination thereof.

Some examples of the method, apparatuses, and non-transitory computer-readable medium described herein may further include operations, features, means, or instructions for refraining from transmitting a downlink control channel indicating a transmission addressed to a C-RNTI of a MAC entity of the UE, where the first active state is maintained based on the downlink control channel not being transmitted.

In some examples of the method, apparatuses, and non-transitory computer-readable medium described herein, the downlink control channel may be expected to be transmitted after receiving a random access response message as part of a random access procedure.

Some examples of the method, apparatuses, and non-transitory computer-readable medium described herein may further include operations, features, means, or instructions for determining the first active state of the first DRX operation has expired and for stopping the second active state of the second DRX operation based on the first active state expiring.

Some examples of the method, apparatuses, and non-transitory computer-readable medium described herein may further include operations, features, means, or instructions for determining the first DRX configuration, the second DRX configuration, or both include DRX short cycles for the first DRX operation, the second DRX operation, or both.

In some examples of the method, apparatuses, and non-transitory computer-readable medium described herein, the first active state for the first DRX operation associated with the DRX short cycles may be independent of the second active state for the second DRX operation associated with the DRX short cycles.

In some examples of the method, apparatuses, and non-transitory computer-readable medium described herein, a configuration of DRX short cycles for the second DRX operation may be ignored or prohibited.

In some examples of the method, apparatuses, and non-transitory computer-readable medium described herein, the first DRX configuration, the second DRX configuration, or both may be transmitted via higher layer signaling.

Some examples of the method, apparatuses, and non-transitory computer-readable medium described herein may further include operations, features, means, or instructions for transmitting, via higher layer signaling, an indication of the CCs to be included the primary group, the CCs to be included the secondary group, or a combination thereof.

In some examples of the method, apparatuses, and non-transitory computer-readable medium described herein, the primary group may include a PDG, and the secondary group may include an SDG.

In some examples of the method, apparatuses, and non-transitory computer-readable medium described herein, the first DRX configuration, the second DRX configuration, or both include a connected mode DRX configuration defined per MAC entity across the CCs of the primary group and the CCs of the secondary group for the CA communications.

In some examples of the method, apparatuses, and non-transitory computer-readable medium described herein, the CCs of the primary group and the CCs of the secondary group may be in a same or different frequency range, may have a same or different numerology, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
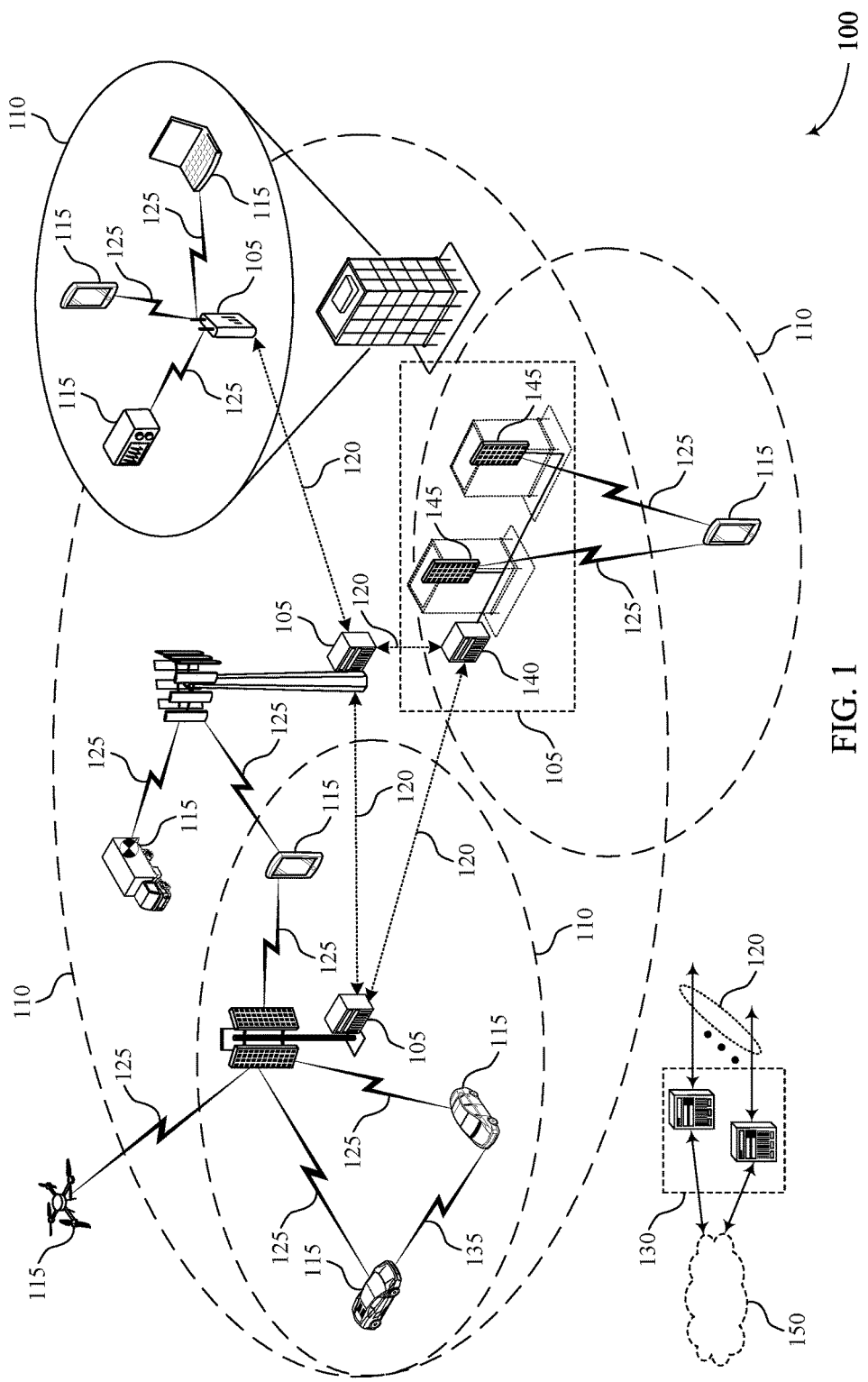
FIG. 1 illustrates an example of a system for wireless communications that supports semi-independent discontinuous reception (DRX) groups in accordance with aspects of the present disclosure.

In some wireless communications systems, a discontinuous reception (DRX) mode may be configured for different component carriers (CCs) of a carrier aggregation (CA) communications configuration between a user equipment (UE) and a base station. Each CC of the CA may be in different frequency ranges and have different numerologies. Thus, the CCs may be grouped into a primary DRX group (PDG) and a secondary DRX group (SDG) based on which frequency range/numerology the CCs use. However, an active time duration for the SDG may be a different length duration (e.g., shorter) than an active time duration for the PDG (e.g., for power savings). Additionally, the PDG may be used for important signaling, such as paging, system information, a slot-format indication, a wake-up/secondary cell (SCell) dormancy indication, uplink control information, acknowledgment feedback, etc. (e.g., the SDG may not be configured for uplink transmissions). Accordingly, it may be desirable to ensure the PDG is in an active state whenever the SDG is in an active state regardless of active time durations to enable communication of important signaling on both the PDG and SDG.

As described herein, to ensure that a PDG is in an active time when an SDG is also in an active time, some dependency in DRX processes may be considered. For example, when a downlink control channel (e.g., a physical downlink control channel (PDCCH)) indicating a new data transmission in the SDG is received, a timer for the active times of the PDG and the SDG may be started or restarted. Additionally or alternatively, when a DRX cycle is configured, the active time of the PDG may include times where an on duration timer, an inactivity timer, a downlink retransmission timer, an uplink retransmission timer, or a contention resolution timer for either the PDG or SDG is active. In some cases, the PDG active time may also be maintained when a scheduling request is transmitted in either the PDG or the SDG and while the scheduling request is pending. Additionally, the PDG active time may be maintained when a downlink control channel indicating a new transmission addressed to a cell radio network temporary identifier (C-RNTI) of a media access control (MAC) entity of the UE has not been received in the PDG or SDG after receiving a random access response message. In some cases, if an inactivity timer of the PDG expires (e.g., resulting in the PDG entering a sleep or inactive time), an inactivity timer of the SDG may also be stopped. The above described techniques may be used for DRX short cycle durations as well. In some cases, the timers for the active times of the PDG and the SDG may be independent of each other for DRX short cycles. Additionally or alternatively, the DRX short cycles for the SDG may be ignored or prohibited.

Aspects of the disclosure are initially described in the context of wireless communications systems. Additionally, aspects of the disclosure are illustrated through an additional wireless communications system, a DRX configuration, a DRX short cycle configuration, and a process flow. Aspects of the disclosure are further illustrated by and described with reference to apparatus diagrams, system diagrams, and flowcharts that relate to semi-independent DRX groups.

FIG. 1 illustrates an example of a wireless communications system 100 that supports semi-independent DRX groups in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using CA or multi-carrier operation. A UE 115 may be configured with multiple downlink CCs and one or more uplink CCs according to a CA configuration. CA may be used with both frequency division duplexing (FDD) and time division duplexing (TDD) CCs.

In some examples (e.g., in a CA configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a CA configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE 115 may enter a DRX mode to conserve power usage at the UE 115. When a UE 115 operates in a DRX mode, the UE 115 may transition between an active mode and an inactive mode in a DRX cycle. When the UE 115 is in an active DRX duration, the UE 115 may be configured to transmit and receive information, and when the UE 115 is in an inactive DRX duration the UE 115 may refrain from monitoring for signals from the base station and may also refrain from transmitting or receiving some types of information. In some examples, a base station 105 may also enter a DRX mode to conserve power usage at the base station 105.

Additionally, the UE 115 may use a connected DRX (CDRX) mode as part of the DRX mode. In some cases, CDRX may be defined per MAC-entity across CCs of a CA configuration. As such, the CDRX may include different DRX configurations per MAC-entity of the UE 115. For example, the different DRX configurations may include specific DRX cycles, on duration timers (e.g., drx-onDurationTimer), inactivity timers (e.g., drx-InactivityTimer), etc., that are defined as subcarrier spacing (SCS)-independent values (e.g., in 'ms'). In some cases, each CC of the CA configuration may be in a different frequency range, have different numerologies, or both. Thus, each CC may have different power-consumption and latency/throughput characteristics. With a single DRX configuration or single DRX mode, a tradeoff between power savings and scheduling flexibility (e.g., latency/throughput) across CCs may be restricted.

To address the issues of trying to configure all CCs into a single DRX configuration/mode (e.g., where the CCs may be located in different frequency ranges with different numerologies), an SDG (e.g., an additional DRX group) may be defined and used for CA communications with DRX. For example, a base station 105 may configure the SDG, where the SDG includes a separate on duration timer, inactivity timer, etc. specific to the SDG. Accordingly, when using a CA configuration, the base station 105 may configure one or more CCs of the CA configuration to a PDG (e.g., a first DRX group, a primary group, etc.) and may configure one or more different CCs of the CA configuration to the SDG (e.g., a second DRX group, a secondary group, etc.). In some cases, the SDG may not be used in combination with using cross-carrier scheduling. Additionally, in some cases, timers for the different DRX groups (e.g., with corresponding DRX configurations) may depend on the frequency range used for the DRX group (e.g., timers for DRX configurations in a frequency range two (FR2) may be different than timers for DRX configurations in a frequency range one (FR1)). In some examples, the PDG may be configured for FR1 (e.g., for CCs operating in FR1), and the SDG may be configured for FR2 (e.g., for CCs operating in FR2).

Accordingly, in some cases, a DRX mode may include multiple DRX groups (e.g., a PDG and an SDG) configured at different frequency ranges (e.g., for a CA configuration with CCs in the PDG and CCs in the SDG). For example, a PDG may be configured at a first frequency range (e.g., FR1), and an SDG may be configured at a second frequency range (e.g., FR2). The characteristics of the first frequency range may include high power efficiency and large coverages. Therefore, PDG may transmit or receive important control data or low-rate and/or latency-tolerant (e.g., low power) information. Further, the PDG may manage transmitting and receiving some types of information (e.g., uplink control information, paging information, slot-format information, etc.). The characteristics of the second frequency range may include large bandwidths and low latency. Therefore, the SDG may transmit or receive information that demands high-rate and/or urgent traffic, at the expense of high power consumption from the UE 115.

In some cases, the DRX processes of each group may work independently. That is, timing of active or inactive durations of a first DRX group may not influence the timing of active or inactive durations of another DRX group. For example, an active state (e.g., active time duration) for the SDG may be different (e.g., shorter) than an active state for the PDG (e.g., for power saving). Additionally, for power efficient operations, the SDG may be used (e.g., stay in a DRX active time) when there is a demand (e.g., higher need to transmit information to the UE 115) and may remain in a sleep duration of the DRX mode (e.g., outside active time) otherwise. To enable these power efficient operations, the base station 105 may configure the timers for the SDG (e.g., drx-onDurationTimer, drx-InactivityTimer, etc.) to be shorter than the timers for the PDG. However, having the timers be shorter for the SDG may not be enough. Additionally, independent DRX groups may degrade throughput and power efficiency of the UE 115. For example, the UE 115 may fail to transmit information of an SDG during an inactive duration of a PDG due to the PDG controlling certain signaling (e.g., uplink control information).

Wireless communications system 100 may support efficient techniques for a semi-independent DRX group configuration for a UE 115 configured to communicate on at least a PDG and an SDG. As described herein, the UE 115 and a base station 105 may implement a DRX coupling rule to ensure a PDG is in an active mode when an SDG is in an active mode. In some examples, semi-independent DRX groups may include DRX long cycles and DRX short cycles. The UE 115 may manipulate active or inactive mode timers of each semi-independent DRX group. In some cases, the UE may trigger or extend an active mode of the PDG when an SDG active mode is triggered. Additionally, the UE may end an active mode of the SDG when an active mode of the PDG expires.

Figure 2:
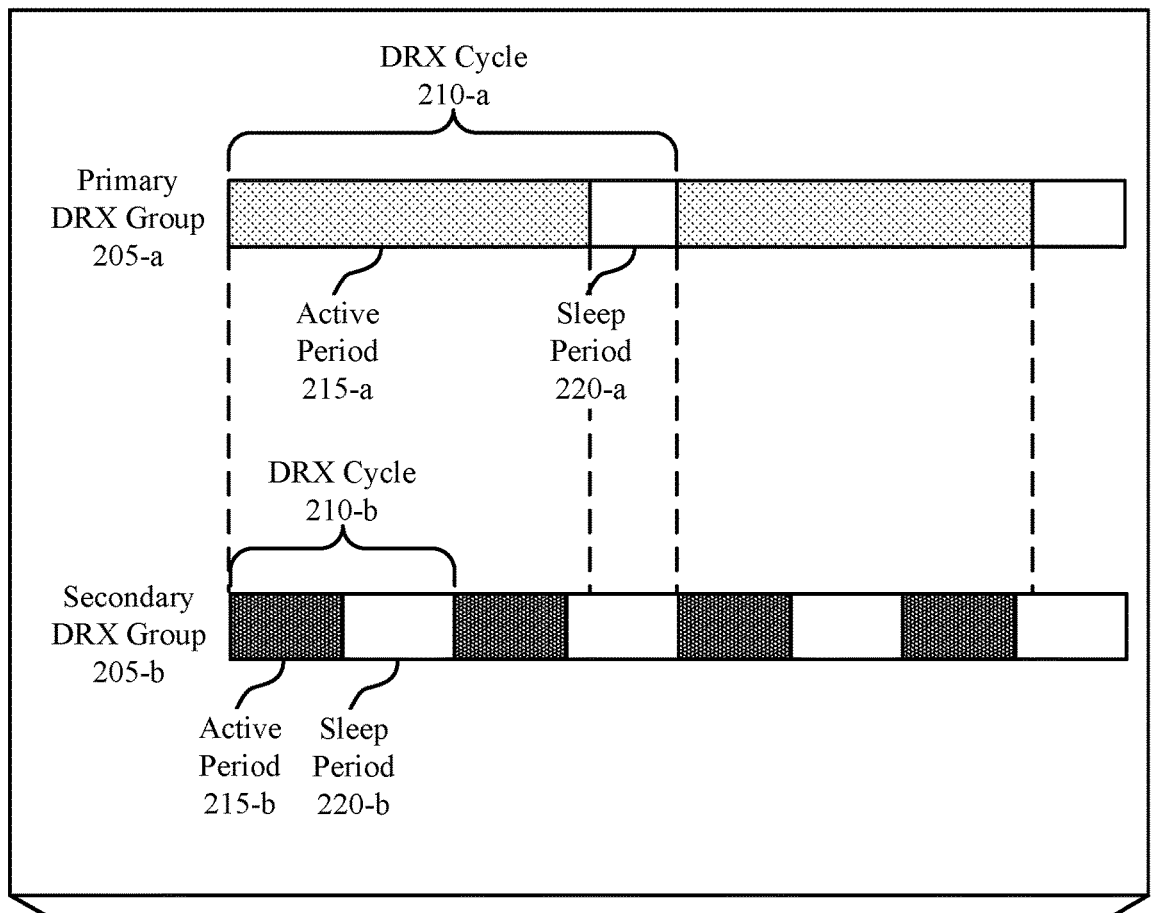
FIG. 2 illustrates an example of a wireless communications system that supports semi-independent DRX groups in accordance with aspects of the present disclosure.
Figure 2:
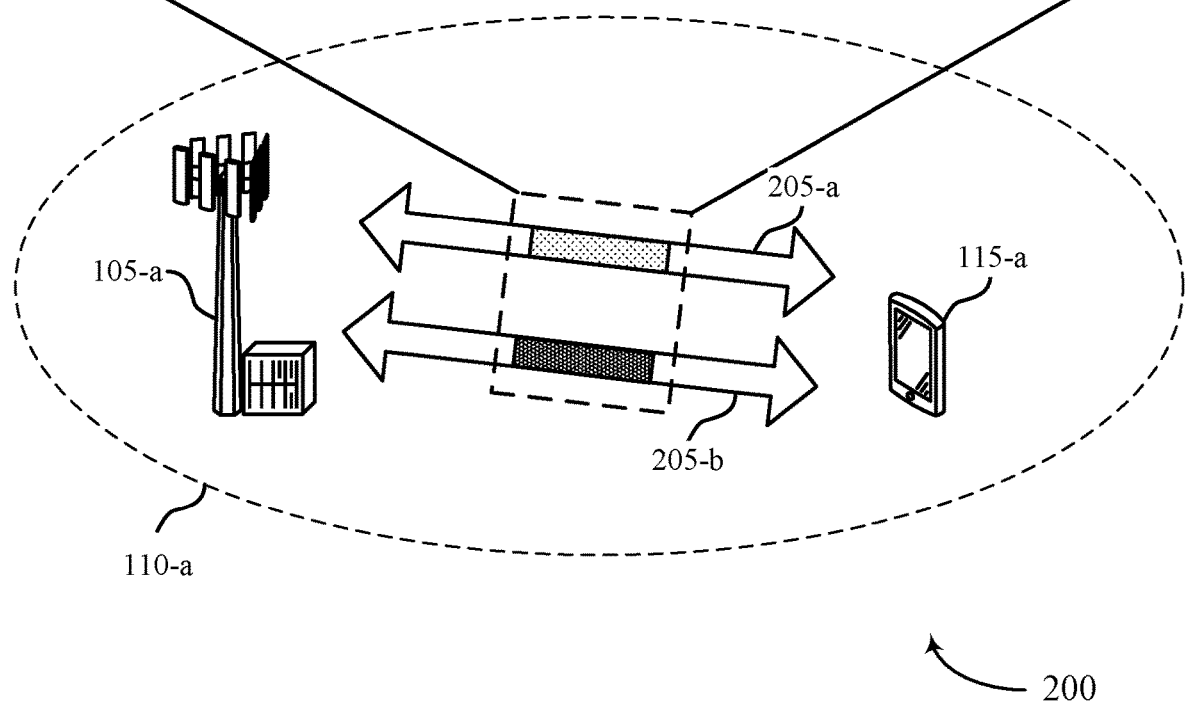

FIG. 2 illustrates an example of a wireless communications system 200 that supports semi-independent DRX groups in accordance with aspects of the present disclosure. In some examples, wireless communications system 200 may implement aspects of or may be implemented by aspects of wireless communications system 100. For example, wireless communications system 200 may include a base station 105-a and a UE 115-a, which may be examples of corresponding base stations 105 and UEs 115, respectively, as described with reference to FIG. 1.

As described herein, to save battery power, UE 115-a may utilize a DRX cycle when communicating with base station 105-a that includes a periodic switching (e.g., on and off) of a receiver. DRX cycles may be configured in the downlink direction so that UE 115-a does not have to decode a PDCCH or does not have to receive physical downlink shared channel (PDSCH) transmissions in certain subframes. In some cases, UE 115-a may monitor a wireless link continuously for an indication that UE 115-a is to receive data. Additionally or alternatively (e.g., to conserve power and extend battery life) UE 115-a may be configured with a DRX cycle (e.g., by base station 105-a). The DRX cycle may consist of an on duration (e.g., an active time, an active period, etc.) when UE 115-a may monitor for control information (e.g., on PDCCH) and a DRX period (e.g., sleep period, inactive time, etc.) when UE 115-a may power down its radio components. In some cases, UE 115-a may be configured with a DRX short cycle and a DRX long cycle. For example, UE 115-a may enter a DRX long cycle if UE 115-a is inactive for one or more DRX short cycles. The transition between the DRX short cycle, the DRX long cycle, and continuous reception may be controlled by an internal timer or by messaging from base station 105-a.

In some cases, UE 115-a may monitor for and receive scheduling messages on a PDCCH during the on duration(s). While monitoring the PDCCH for a scheduling message, UE 115-a may initiate a DRX inactivity timer (e.g., drx-InactivityTimer). If a scheduling message is successfully received, UE 115-a may prepare to receive data indicated by the scheduling message, and the DRX inactivity timer may be reset. When the DRX inactivity timer expires without receiving a scheduling message, UE 115-a may transition to the DRX period (e.g., become inactive). Additionally or alternatively, UE 115-a may move into a DRX short cycle and may start a DRX short cycle timer. When the DRX short cycle timer expires, UE 115-a may resume a DRX long cycle.

Additionally, the DRX cycle may include a CDRX mode, where UE 115-a stays connected to base station 105-a during both the on durations (e.g., awake durations) and the DRX periods (e.g., sleep periods). The CDRX mode may allow UE 115-a to make signal-free transitions between sleep and awake states (e.g., the DRX periods and on durations, respectively, or sleep and awake modes). Base station 105-a may schedule PDCCH/PDSCH transmissions during active times (e.g., awake states, on durations, etc.). Additionally, UE 115-a may monitor a PDCCH (i.e., wake up or be awake) during the active times. In some cases, the active times may include when an on-duration timer is running, an inactive-timer is running, a scheduling request is pending, or a combination thereof. Except for the active times, UE 115-a may sleep to save battery power while in the CDRX (or DRX) mode.

In some cases, UE 115-a may enter an active time when UE 115-a detects uplink data to transmit to base station 105-a. During the active time, UE 115-a may perform a scheduling request operation to request resources and configuration information for subsequently transmitting the uplink data. For example, the scheduling request operation may include a first step where UE 115-a transmits a scheduling request via an uplink channel (e.g., a physical uplink control channel (PUCCH)) to base station 105-a, a second step where base station 105-a transmits an uplink grant via a downlink channel (e.g., a PDCCH) to UE 115-a based on receiving the scheduling request, and a third step where UE 115-a transmits the uplink data via a separate uplink channel (e.g., a physical uplink shared channel (PUSCH)) on resources as indicated in the uplink grant. In some examples, UE 115-a may additionally save power based on performing the scheduling request operation in a single active time of the CDRX mode (e.g., a single on duration).

In addition to using the DRX cycle (e.g., DRX/CDRX configuration, DRX/CDRX mode, etc.), UE 115-a may also communicate with base station 105-a using a CA configuration. For example, UE 115-a may be configured (e.g., by base station 105-a) with multiple downlink CCs and one or more uplink CCs according to the CA configuration. Accordingly, UE 115-a may receive multiple downlink messages from base station 105-a on the multiple downlink CCs simultaneously and/or may transmit multiple uplink messages to base station 105-a on the one or more uplink CCs. Additionally or alternatively, base station 105-a may transmit a same downlink message on each of the multiple downlink CCs to increase chances (e.g., increase reliability) that the downlink message is successfully received and decoded by UE 115-a, and UE 115-a may transmit a same uplink message on each of the one or more uplink CCs to also increase chances (e.g., increase reliability) that the uplink message is successfully received and decoded by base station 105-a. However, the different CCs may be configured in different frequency ranges (e.g., FR1, FR2, etc.) and/or with different numerologies (e.g., SCSs, slot durations, etc.), such that using a single DRX configuration may not be sufficient for all CCs of a CA configuration.

Accordingly, as described herein, to use DRX cycles with a CA configuration, base station 105-a may configure semi-independent DRX groups 205 for communications with UE 115-a. For example, base station 105-a may transmit a first DRX configuration to UE 115-a for a PDG 205-a, where PDG 205-a includes one or more CCs of the CA configuration, and may transmit a second DRX configuration for an SDG 205-b, where SDG 205-b includes one or more different CCs of the CA configuration than the CCs configured for PDG 205-a. Additionally, PDG 205-a may be used for important signaling (e.g., paging, system information, slot-format indication, wake-up/SCell-dormancy activation, uplink control information, etc.), while SDG 205-b may be used for as-needed signaling (e.g., urgent traffic, high-rate traffic, etc.). In some cases, SDG 205-b may not include an uplink CC or an uplink control channel resource or may not be used for uplink communications. As such, if UE 115-a has uplink information to transmit for communications associated with SDG 205-b while PDG 205-a is inactive, the UE 115-a may be unable to transmit the uplink information.

The techniques described herein may enable UE 115-a and base station 105-a to use a rule to ensure PDG 205-a is in an active state when SDG 205-b is in an active state (e.g., based on a dependency in DRX processes between PDG 205-a and SDG 205-b). For example, the rule may be a DRX coupling rule where a first active state of PDG 205-a (e.g., via the first DRX configuration) is determined based on a second active state of SDG 205-b (e.g., via the second DRX configuration) or vice versa (e.g., the second active state of SDG 205-b is determined based on the first active state of PDG 205-a). Additionally, base station 105-a may configure (e.g., by higher layer signaling, such as an RRC message) which CCs are in PDG 205-a and which CCs are in SDG 205-b (e.g., to enable the DRX coupling rule).

In some cases, PDG 205-a and SDG 205-b may include separate parameters for the respective DRX configurations, such as DRX cycles 210, active periods 215 (e.g., on durations, active times, etc.), sleep periods 220 (e.g., inactive times, DRX periods, etc.), etc. For example, PDG 205-a may have a first DRX cycle 210-a that includes a first active period 215-a and a first sleep period 220-a, and second DRX cycle 210-a may have a second DRX cycle 210-b that includes a second active period 215-b and a second sleep period 220-b. Additionally, the active periods 215 of each DRX group 205 may be referred to as active times for the corresponding DRX groups 205 of UE 115-a. Accordingly, during the active periods 215, UE 115-a may monitor for messages and/or communicate with base station 105-a, and during the sleep periods 220, UE 115-a may enter an inactive or sleep mode. While second DRX cycle 210-b includes a cycle duration, an active period duration, and a sleep duration that are different (e.g., shorter durations, longer durations) than the corresponding durations in first DRX cycle 210-a, the durations of one DRX cycle 210 for a DRX group 205 may be longer or shorter with respect to the durations of the other DRX cycle 210 for the other DRX group 205.

To support the DRX coupling rule for ensuring PDG 205-a is active when SDG 205-b is active (e.g., or vice versa), base station 105-a and UE 115-a may use one or more different options partly, singularly, or in combination. For example, each of the DRX groups 205 may be in active state (e.g., active time, active periods 215) at the same time for DRX long cycles (e.g., whether or not a DRX short cycle is configured for either DRX group 205) by using the following options. In some cases, if SDG 205-b receives a PDCCH (e.g., a downlink control channel) from base station 105-a indicating a new data transmission (e.g., downlink, uplink, etc.), UE 115-a and base station 105-a may trigger a start or restart of an inactivity timer (e.g., drx-Inactivity-Timers) for both PDG 205-a and SDG 205-b. That is, if a PDCCH is received on one or more CCs of SDG 205-b, a timer for measuring how long UE 115-a has been in data inactivity (e.g., inactivity timer, drx-InactivityTimer, etc.) may be reset for both PDG 205-a and SDG 205-b (e.g., even though no downlink message may have been received on PDG 205-a). Accordingly, PDG 205-a may be prevented from going to sleep earlier than SDG 205-b (e.g., at UE 115-a and known by base station 105-a). Alternatively, if PDG 205-a receives a PDCCH from base station 105-a indicating a new data transmission (e.g., downlink, uplink, etc.), UE 115-a and base station 105-a may trigger a start or restart of an inactivity timer (e.g., drx-InactivityTimers) for PDG 205-a but not for an inactivity timer for SDG 205-b.

In some cases, the DRX active time (e.g., active period 215) in PDG 205-a may be redefined to support the DRX coupling rule. For example, when a DRX cycle 210 is configured, the active time (e.g., active state) of PDG 205-a may be defined as (e.g., include) the time when at least one or all timers associated with a DRX active time (e.g., DRX active state) is running on either DRX group 205 (e.g., PDG 205-a and/or SDG 205-b). That is, if an on duration timer (e.g., drx-onDurationTimer), an inactivity timer (e.g., drx-InactivityTimer), a downlink retransmission timer (e.g., drx-RetransmissionTimerDL), an uplink retransmission timer (e.g., drx-RetransmissionTimerUL), or a contention resolution timer (e.g., for random access procedures, such as an ra-ContentionResolutionTimer) is running on either PDG 205-a and/or SDG 205-b (e.g., or an additional timer used to indicate an active state of a DRX group 205), the active state of PDG 205-a may be maintained. In some cases, if the active state for PDG 205-a is maintained based on an active timer for SDG 205-b running and an active timer for PDG 205-a is not running at a same instance as the active timer for SDG 205-b is running, UE 115-a may refrain from monitoring for a downlink signal on PDG 205-a and may transmit an uplink signal on PDG 205-a.

Other events, such as a pending scheduling request, on either DRX group 205 may also be used to define a DRX active time (e.g., active state) in PDG 205-a. For example, the active state of PDG 205-a may include a time when a scheduling request is sent on a PUCCH in either PDG 205-a and/or SDG 205-b, where PDG 205-a remains in the active state while the scheduling request is pending. Additionally or alternatively, the active state of PDG 205-a may include a time when a PDCCH indicating a new transmission addressed to a C-RNTI of a MAC entity of UE 115-a has not been received on PDG 205-a or SDG 205-b (e.g., during a random access procedure, such as after successful reception of a random access response for a random access preamble not selected by the MAC entity among random access preambles configured for a contention-based random access procedure).

In some cases, the DRX active time definition for SDG 205-b may include times when an at least one or all timers associated with a DRX active time (e.g., active state) for SDG 205-b is running (e.g., drx-onDurationTimer, drx-InactivityTimer, drx-RetransmissionTimerDL, drx-RetransmissionTimerUL, ra-ContentionResolutionTimer, etc.). Additionally or alternatively, if PDG 205-a transitions (e.g., to an inactive state, sleep period 220, sleep state, etc.) outside an active time (e.g., active state, active period 215, etc.), SDG 205-*b* may also transition (e.g., to an inactive state, sleep period 220, sleep state, etc.) outside an active time (e.g., active state, active period 215, etc.). For example, if a first inactivity timer of PDG 205-*a* expires (e.g., resulting in PDG 205-*a* transitioning to or entering an inactive or sleep state), a second inactivity timer of SDG 205-*b* may be stopped if the second inactivity timer is running at the moment, and SDG 205-*b* may also transition to or enter an inactive or sleep state.

In some cases, UE 115-*a* may start or refrain from starting an on duration timer (e.g., drx-onDurationTimer) on either or both DRX group 205 when receiving a PDCCH on either DRX group 205 based on a wake-up signal behavior configured for UE 115-*a* with either DRX group 205 (e.g., via a corresponding DRX configuration). That is, UE behavior related to a start of the on duration timer (e.g., UE 115-*a* waking up, receiving a wake up signal, etc.) may depend on if UE 115-*a* is configured to monitor for a PDCCH carrying a wake-up signal or not. For example, UE 115-*a* may not start the on duration timer of all configured DRX groups 205 (e.g., PDG 205-*a*, SDG 205-*b*, etc.) for a next DRX long cycle when a value of a 'PDCCH monitoring' bit is '0' and a PDCCH (e.g., carrying a wake-up signal) is transmitted to (e.g., and identified/received by) UE 115-*a*. Alternatively, UE 115-*a* may start the on duration timers of all configured DRX groups 205 for the next DRX long cycle when a value of the 'PDCCH monitoring' bit is '1' and a PDCCH (e.g., carrying a wake-up signal) is transmitted to and received by UE 115-*a*.

Additionally, in some cases, UE 115-*a* may not monitor for a PDCCH for detecting different downlink control information (DCI) formats (e.g., a DCI format 2_6) during an active time (e.g., active state) of PDG 205-*a* and/or SDG 205-*b* (e.g., on a primary cell (PCell), primary secondary cell (PSCell), etc.). For example, if UE 115-*a* is provided with a wakeup-or-not indication (e.g., ps-WakeupOrNot) in a DRX configuration for a corresponding DRX group 205, UE 115-*a* may be indicated by the wakeup-or-not indication on whether UE 115-*a* may not start or whether UE 115-*a* may start an on duration timer (e.g., drx-onDurationTimer) of all configured DRX groups 205 for a next DRX cycle. Alternatively, if UE 115-*a* is not provided a wakeup-or-not indication, UE 115-*a* may not start an active time indicated by an on duration timer of all configured DRX groups 205 for a next DRX cycle.

Additionally, the above described techniques for supporting the DRX coupling rule may be extended for active times of DRX Short cycles (e.g., if configured). Alternatively, active times associated with DRX Short cycles (e.g., DRX short cycles, DRX Short cycles, etc.) may be independent for PDG 205-*a* and SDG 205-*b*. Additionally or alternatively, DRX Short cycles may be configured on PDG 205-*b*, while DRX Short cycles may be ignored or prohibited for SDG 205-*b*. The techniques for using DRX Short cycles for a PDG 205-*a* and an SDG 205-*b* are described in more detail with reference to FIG. 4.

Figure 3:
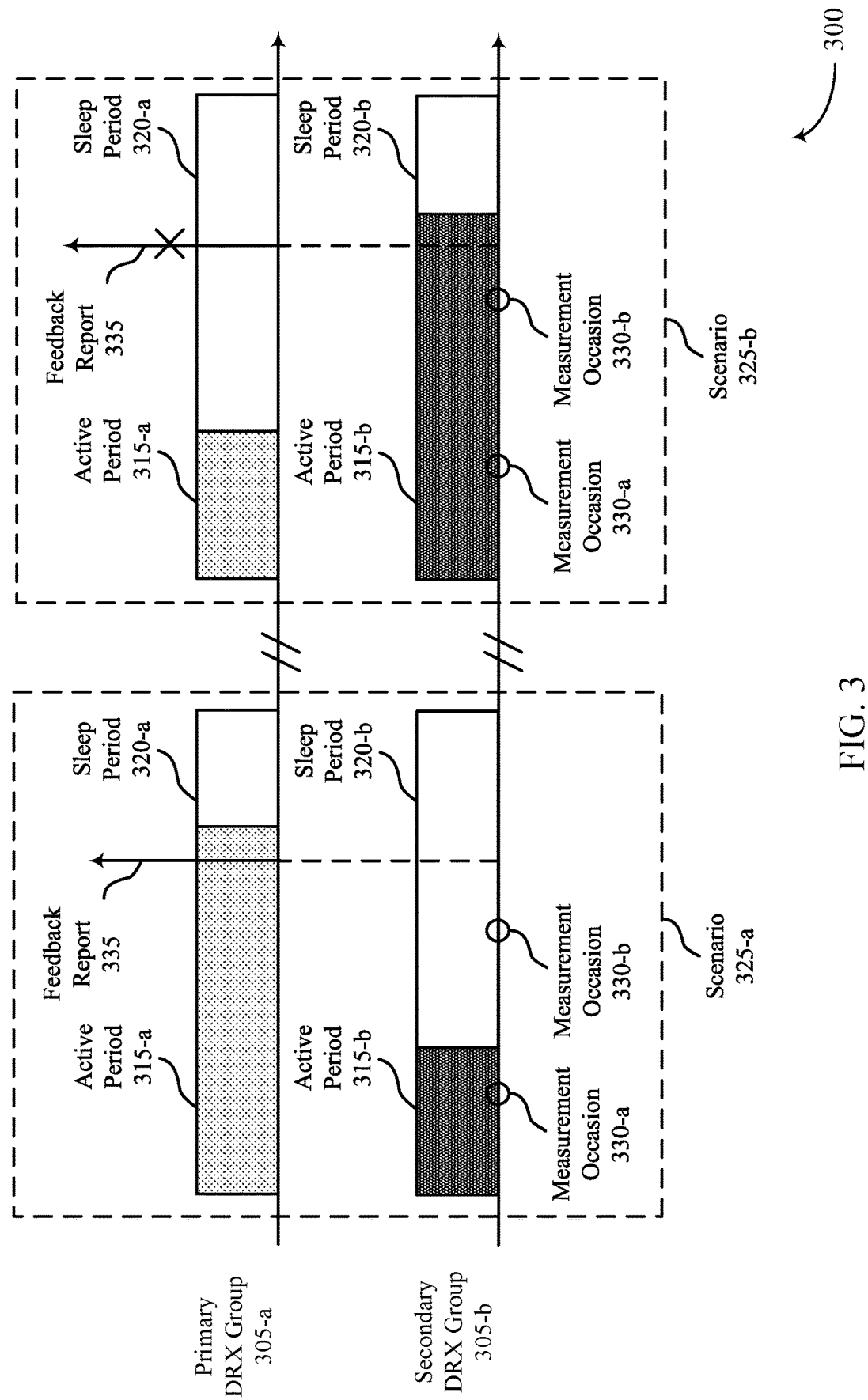
FIG. 3 illustrates an example of a DRX configuration in accordance with aspects of the present disclosure.

FIG. 3 illustrates an example of a DRX configuration 300 in accordance with aspects of the present disclosure. In some examples, DRX configuration 300 may implement aspects of or may be implemented by aspects of wireless communications system 100, wireless communications system 200, or both. For example, DRX configuration 300 may be used and supported by a UE 115 and a base station 105, which may be examples of corresponding UEs 115 and base stations 105, respectively, as described with reference to FIGS. 1 and 2. As described herein, the UE 115 and the base station 105 may operate according to a CA configuration with multiple DRX groups 305 with corresponding DRX configurations, where the DRX groups 305 include at least a PDG 305-*a* (e.g., with one or more CCs) and an SDG 305-*b* (e.g., with one or more different CCs), as described with reference to FIG. 2. For example, each DRX group 305 may include a DRX cycle that consists of at least an active period 315 and a sleep period 320, such as a first active period 315-*a* and a first sleep period 320-*a* for PDG 305-*a* and a second active period 315-*b* and a second sleep period 320-*b* for SDG 305-*b*.

In some cases, if DRX processes of the DRX groups 305 are completely independent (e.g., first active period 315-*a* is independent of second active period 315-*b*, first sleep period 320-*a* is independent of sleep period 320-*b*, etc.), an active time of SDG 305-*b* (e.g., active state, second active period 315-*b*, etc.) may not be shorter than an active time of PDG 305-*a* (e.g., active state, first active period 315-*a*, etc.). For example, even if configured timers are shorter for SDG 305-*b*, the active time of SDG 305-*b* may be extended by starting/restarting an inactivity timer (e.g., drx-InactivityTimer) for SDG 305-*b* depending on traffic in SDG 305-*b* (e.g., or another corresponding DRX group 305). Since PDG 305-*a* may be used for important signals, such as paging, system information, a slot-format indication, a wake-up/SCell-dormancy indication, uplink control information (e.g., for a single PUCCH group), etc., it may be desirable to ensure that an active time for PDG 305-*a* contains an active time for SDG 305-*b* (e.g., based on a DRX coupling rule). DRX configuration 300 may include two examples of scenarios 325 where the DRX groups 305 and processes of each DRX group 305 are configured and operated independently. In some cases, both scenarios 325 may include PDG 305-*a* and SDG 305-*b* being in a same PUCCH group.

For a first scenario 325-*a*, PDG 305-*a* may be in an active time while SDG 305-*b* is not in active time (e.g., first active period 315-*a* may include times where second active period 315-*b* is not occurring). Additionally, the UE 115 may be configured (e.g., by the base station 105, another network device, preconfigured, etc.) to perform a measurement in one or more measurement occasions 330. For example, the UE 115 may perform measurements at a first measurement occasion 330-*a* and at a second measurement occasion 330-*b* on signals received on one or more CCs of SDG 305-*b* to determine a channel quality for channels used with SDG 305-*b*. In some cases, the measurements may include channel state information (CSI) measurements, where the UE 115 is expected to transmit CSI feedback reports for the CSI measurements (e.g., to enable the base station 105 to adjust transmission parameters based on the CSI measurements reported in the CSI feedback report). As shown, although second measurement occasion 330-*b* may not be used (e.g., based on SDG 305-*b* being in the second sleep period 320-*b* when second measurement occasion 330-*b* occurs), the UE 115 may transmit the measured channel quality (e.g., CSI) from first measurement occasion 330-*a* in a feedback report 335 over a PUCCH in PDG 305-*a*. The feedback report 335 may include a periodic or semi-persistent CSI report for SDG 305-*b* that is sent over the PUCCH in PDG 305-*a*.

For a second scenario 325-*b*, PDG 305-*a* may not be in an active time while SDG 305-*b* is in an active time (e.g., first active period 315-*a* does not fully include second active period 315-*b*). As such, even though the UE 115 is configured for the first measurement occasion 330-*a* and the second measurement occasion 330-*b* during the second active period 315-*b* of SDG 305-*b* and performs the channel measurements (e.g., CSI measurements) on SDG 305-*b* during the active time (e.g., active state, second active period 315-*b*), the UE 115 cannot send the feedback report 335 (e.g., periodic/semi-persistent CSI report) on PDG 305-*a* because PDG 305-*a* is outside the active time (e.g., in first sleep period 320-*a*). Accordingly, resources used for performing the measurements during the measurement occasions 330 in second scenario 325-*b* may be wasted by the UE 115. Based on the techniques as described with reference to FIG. 2, the UE 115 may support the DRX coupling rule to ensure that PDG 305-*a* is active when SDG 305-*b* is active and vice versa, such that neither scenario 325 occurs or other scenarios where a process or operation cannot be performed due to either PDG 305-*a* and/or SDG 305-*b* being inactive.

For example, when the UE 115 is configured to perform a CSI measurement with one or more DRX configurations, the following rules may be followed. If the UE 115 is configured with DRX, a most recent CSI measurement occasion on a serving cell (e.g., different CCs of PDG 305-*a* or SDG 305-*b* with the base station 105) may occur in a DRX active time of the serving cell for CSI to be reported. Additionally or alternatively, if the UE 115 is configured with DRX, the UE may not perform measurement of CSI reference signal (CSI-RS) resources other than during the active time of a serving cell for measurements based on a CSI configuration (e.g., CSI-RS-Resource-Mobility) configured for the serving cell. In some cases, if the UE 115 is configured to monitor for a specific DCI (e.g., DCI format 2_6), the UE 115 may not perform measurements other than during the active time and during a timer duration indicated by an on duration timer (e.g., drx-onDurationTimer) of the serving cell based on the CSI configuration (e.g., CSI-RS-Resource-Mobility).

Additionally or alternatively, if the UE 115 is configured with DRX and a DRX cycle in use is larger than a threshold value (e.g., 80 ms), the UE 115 may not expect CSI-RS resources are available other than during the active time of a serving cell for measurements based on the CSI configuration (e.g., CSI-RS-Resource-Mobility) configured for the serving cell. If the UE 115 is configured with DRX and configured to monitor for the DCI format (e.g., DCI format 2_6) and the DRX cycle in use is larger than the threshold value, the UE 115 may not expect that the CSI-RS resources are available other than during the active time and during the time duration of the serving cell indicated by the on duration timer (e.g., drx-onDurationTimer) for measurements based on the CSI configuration. Otherwise, the UE 115 may assume that CSI-RS are available for measurements based on the CSI configuration (e.g., CSI-RS-Resource-Mobility).

When DRX is configured, the UE 115 may report a CSI report only if receiving at least one CSI-RS transmission occasion for channel measurement and a CSI-RS and/or CSI interference measurement (CSI-IM) occasion for interference measurement on a serving cell in a DRX active time of the cell no later than a CSI reference resource and drops the report otherwise. When the UE 115 is configured to monitor for the DCI format (e.g., DCI format 2_6) and if the UE 115 is configured by a higher layer parameter (e.g., an indication for transmitting a periodic CSI report, such as a PS-Periodic_CSI_TransmitOrNot indication) to report CSI with the higher layer parameter (e.g., reportConfigType) set to 'periodic' when the on duration timer (e.g., drx-onDurationTimer) is not started, the UE 115 may report CSI during the time duration of the serving cell indicated by the on duration timer (e.g., drx-onDurationTimer) also outside active time. When the UE 115 is configured to monitor for the DCI format (e.g., DCI format 2_6) and if the UE 115 configured by a higher layer parameter (e.g., an indication for transmitting a periodic CSI report, such as a PS Periodic L1-RSRP_TransmitOrNot indication) to report a power measurement (e.g., such as a reference signal received power (RSRP) measurement for a Layer 1 (L1-RSRP)) with the higher layer parameter (e.g., reportConfigType) set to 'periodic' when the on duration timer (e.g., drx-onDurationTimer) is not started, the UE 115 may report the power measurement (e.g., L1-RSRP measurement) during the time duration of the serving cell indicated by the on duration timer (e.g., drx-onDurationTimer) also outside active time. In some cases, these techniques may be used for CSI reporting with two DRX groups 305.

Figure 4:
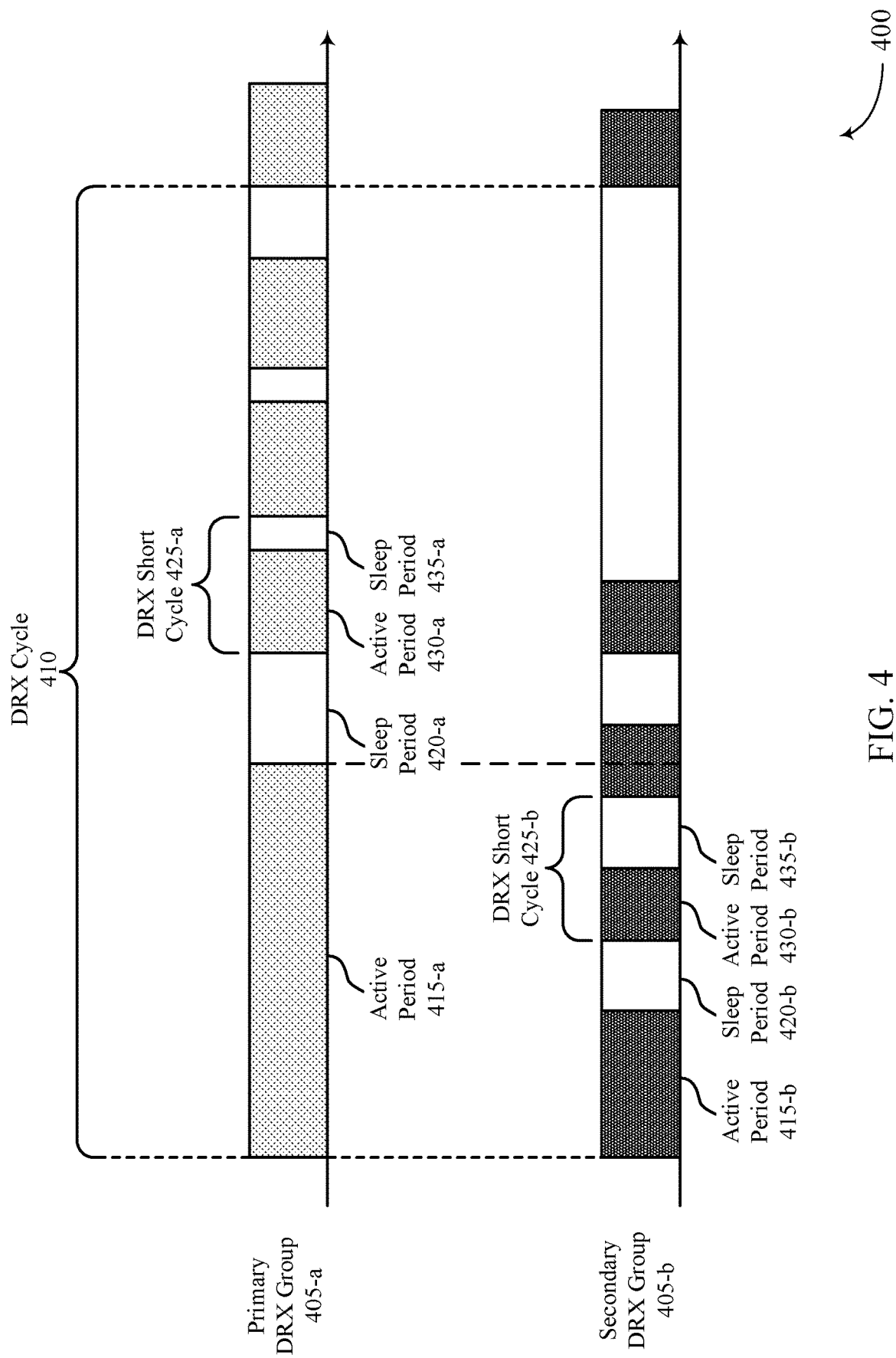
FIG. 4 illustrates an example of a DRX short cycle configuration in accordance with aspects of the present disclosure.

FIG. 4 illustrates an example of a DRX short cycle configuration 400 in accordance with aspects of the present disclosure. In some examples, DRX short cycle configuration 400 may implement aspects of or may be implemented by aspects of wireless communications system 100, wireless communications system 200, or both. For example, DRX short cycle configuration 400 may be used and supported by a UE 115 and a base station 105, which may be examples of corresponding UEs 115 and base stations 105, respectively, as described with reference to FIGS. 1-3. As described herein, the UE 115 and the base station 105 may operate according to a CA configuration with multiple DRX groups 405 with corresponding DRX configurations, where the DRX groups 405 include at least a PDG 405-*a* (e.g., with one or more CCs) and an SDG 405-*b* (e.g., with one or more different CCs), as described with reference to FIGS. 2 and 3. For example, each DRX group 405 may include a DRX cycle 410 that consists of at least an active period 415 and a sleep period 420, such as a first active period 415-*a* and a first sleep period 420-*a* for PDG 305-*a* and a second active period 415-*b* and a second sleep period 320-*b* for SDG 305-*b* as part of the DRX cycle 410.

In some cases, the base station 105 may also configure one or more DRX short cycles 425 (e.g., DRX Short cycles) for each of the DRX groups 405. For example, the base station 105 may configure a first DRX short cycle 425-*a* for PDG 405-*a* and a second DRX short cycle 425-*b* for SDG 405-*b*, where each DRX short cycle 425 includes configured active periods 430 and sleep periods 435. First DRX short cycle 425-*a* may include a first active period 430-*a* and a first sleep period 435-*a*, and second DRX short cycle 425-*b* may include a second active period 430-*b* and a second sleep period 435-*b*. The active periods 430 and sleep periods 435 of the DRX short cycles 425 may be a same or different duration than the active periods 415 and sleep periods 420 of DRX cycle 410 for each DRX group 405. In some cases, the DRX short cycles 425 may be used for as needed signaling and communications (e.g., urgent traffic) or based on different timers for each DRX configuration for the corresponding DRX groups 405.

Subsequently, when configured with the DRX short cycles 425, the UE 115 may perform different actions. For example, active times (e.g., active periods 415, active states, etc.) associated with the DRX short cycles 425 may be independent for PDG 405-*a* and for SDG 405-*b*. That is, each DRX group 405 may include separate and independent on duration timers (e.g., drx-onDurationTimer), inactivity timers (e.g., drx-InactivityTimer), etc., associated with the DRX short cycles 425 (e.g., DRX Short cycles). The on duration timers, inactivity timers, etc. for the DRX cycle 410 (e.g., a DRX Long cycle) for each DRX group 405 may depend on each other based on the techniques described with reference to FIG. 2. Additionally or alternatively, the DRX short cycles 425 (e.g., DRX Short cycles) may be allowed to be configured on PDG 405-*a*, and any DRX short cycles 425 configured on SDG 405-*b* may be ignored or prohibited (e.g., by the base station 105 and/or the UE 115).

In some cases, the techniques described with reference to FIG. 2 for the DRX coupling rule to ensure PDG 405-*a* is active when SDG 405-*b* is active and vice versa may be applied to the DRX short cycles 425 (e.g., DRX Short cycles). For example, DRX Short cycles and DRX Long cycles may not be distinguished when applying the techniques described with reference to FIG. 2 for configuring PDG 405-*a* to be active when SDG 405-*b* is active. In some cases, the active time for PDG 405-*a* may not overshadow (e.g., contain) the active time for SDG 405-*b* if only an on duration timer (e.g., drx-onDurationTimer) is running on SDG 405-*b*.

Figure 5:
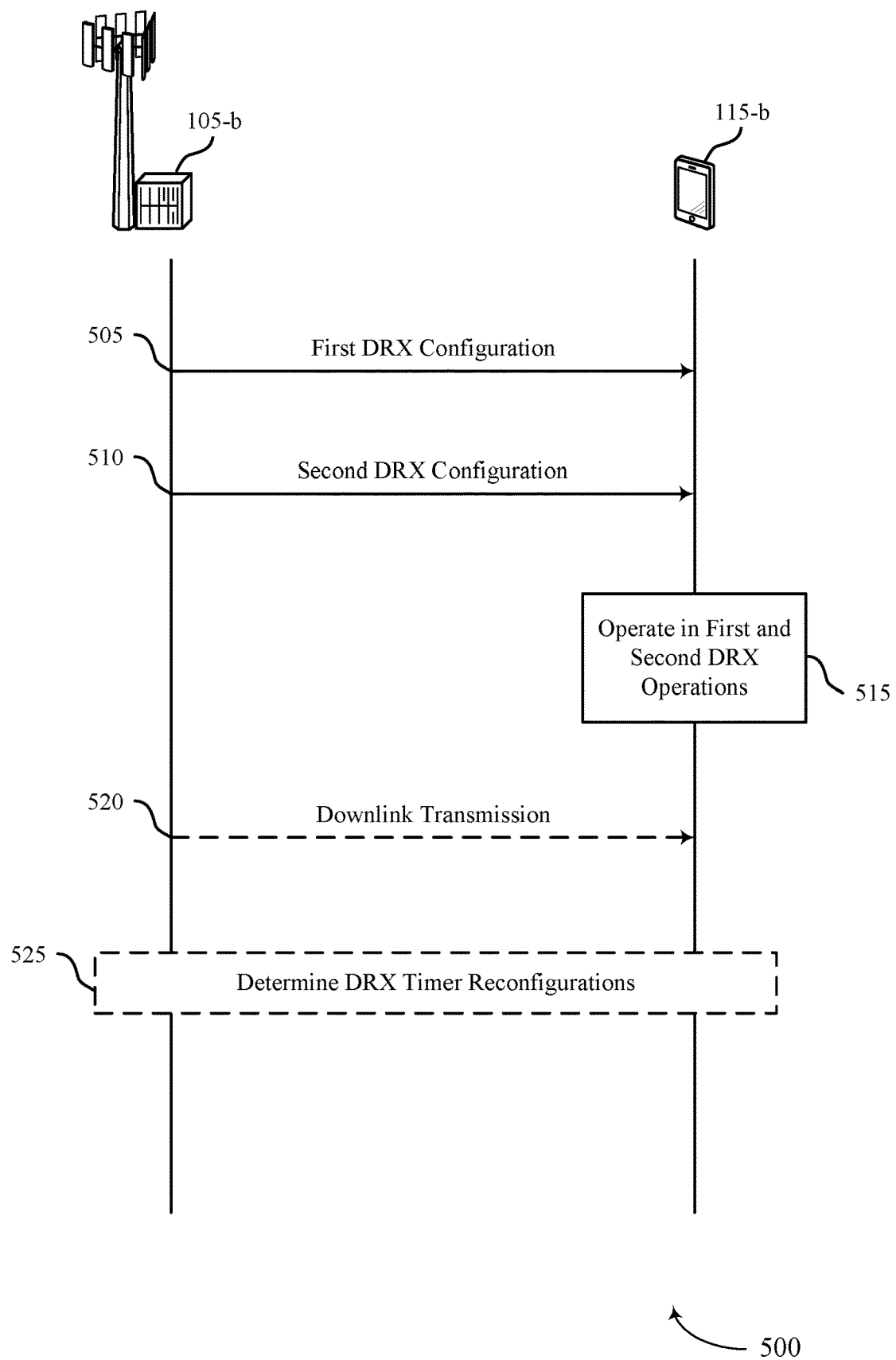
FIG. 5 illustrates an example of a process flow that supports semi-independent DRX groups in accordance with aspects of the present disclosure.

FIG. 5 illustrates an example of a process flow 500 that supports semi-independent DRX groups in accordance with aspects of the present disclosure. In some examples, process flow 500 may implement aspects of or may be implemented by aspects of wireless communications system 100, wireless communications system 200, or both. For example, process flow 500 may include a base station 105-*b* and a UE 115-*b*, which may be examples of the corresponding base stations 105 and UEs 115, respectively, as described with reference to FIGS. 1-4. As described herein, process flow 500 may illustrate an implementation of semi-independent DRX groups.

In the following description of process flow 500, the operations between UE 115-*b* and base station 105-*b* may be performed in different orders or at different times. Certain operations may also be left out of process flow 500, or other operations may be added to process flow 500. It is to be understood that while UE 115-*b* and base station 105-*b* are shown performing a number of the operations of process flow 500, any wireless device may perform the operations shown.

At 505, UE 115-*b* may receive a first DRX configuration from base station 105-*b*. The first DRX configuration may associate with a first DRX operation for CA communications with the base station 105-*b* over a primary group of CCs. In some cases, the primary group of CCs may be a PDG.

At 510, UE 115-*b* may receive a second DRX configuration from base station 105-*b*. The second DRX configuration may associate with a second DRX operation for the CA communications with base station 105-*b* over a secondary group of CCs. In some cases, first DRX configuration, the second DRX configuration, or both may be received via higher layer signaling (e.g., RRC signaling). Additionally, the secondary group of CCs may be an SDG. In some cases, the first DRX configuration, the second DRX configuration, or both may include a CDRX configuration defined per MAC entity across the CCs of the primary group and the CCs of the secondary group for the CA communications. Additionally, the CCs of the primary group and the CCs of the secondary group may be in a same or different frequency range (e.g., FR1, FR2, etc.), have a same or different numerology, or a combination thereof.

At 515, UE 115-*b* may begin operating in the first DRX operation and in the second DRX operation. UE 115-*b* may operate in accordance with a DRX coupling rule, which may include that a first active state of the first DRX operation is determined based on a second active state of the second DRX operation, the second active state is determined based on the first active state, or both. Further, in some cases, the coupling rule may include determining that a timer associated with the first active state, the second active state, or both is running for each of the primary group and the secondary group, where the first active state is maintained based on the timer running for each of the primary group and the secondary group. For example, the timer associated with the first active state, the second active state, or both may include an on duration timer, an inactivity timer, a downlink retransmission timer, an uplink retransmission timer, a contention resolution timer, or a combination thereof. Additionally, in some cases, UE 115-*b* may receive, from base station 105-*b*, an indication of the CCs to be included the primary group, the CCs to be included the secondary group, or a combination thereof (e.g., to enable the DRX coupling rule).

In some cases, when determining that a timer associated with the first active state, the second active state, or both is running for each of the primary group and the secondary group, where the first active state is maintained based on the timer running for each of the primary group and the secondary group, UE 115-*b* and/or base station 105-*b* may determine that the first active state is maintained based on the timer for the second active state running, where the timer for the first active state is not running at a same instance as the timer for the second active state is running. Subsequently, UE 115-*b* may refrain from monitoring for a downlink signal on the primary group and may transmit an uplink signal on the primary group, both based on the determination that the first active state is maintained based at least in part on the timer for the second active state is running while the timer for the first active state is not running.

At 520, base station 105-*b* may transmit a downlink signal to UE 115-*b*. In some examples, the downlink signal may include a PDCCH that indicates a new data transmission over a downlink or uplink shared channel. In some cases, the downlink signal may transmit on one or more CCs of the secondary group of CCs during the second active state of the second DRX group. Additionally or alternatively, the downlink signal may transmit on one or more CCs of the primary group of CCs during the primary active state of the first DRX group.

At 525, UE 115-*b* and/or base station 105-*b* may determine to adjust the active times for the primary group or the secondary group. For example, in some cases, UE 115-*b* (e.g., and/or base station 105-*b*) may determine to start or restart a first inactivity timer for the primary group and a second inactivity timer for the secondary group based on receiving the downlink signal on the one or more CCs of the secondary group in accordance with the DRX coupling rule. Additionally or alternatively, the UE 115-*b* may determine to start or restart a first inactivity timer for the primary group based on receiving the downlink signal on the one or more CCs of the primary group, where a second inactivity timer for the secondary group is not started or restarted after the downlink signal is received on the one or more CCs of the primary group. Additionally, UE 115-*b* and/or base station 105-*b* may determine the first active state of the first discontinuous reception operation has expired and may stop the second active state of the second discontinuous reception operation based on the first active state expiring.

In some cases, UE 115-*b* may transmit, to base station 105-*b*, a scheduling request in an uplink control channel. Accordingly, UE 115-*b* and/or base station 105-*b* may determine to maintain the first active state during a pending duration for the scheduling request, the pending duration including a duration where UE 115-*b* is waiting for a downlink control channel from base station 105-*b* in response to the scheduling request. In some cases, the scheduling request may be transmitted on one or more CCs of the primary group, one or more CCs of the secondary group, or a combination thereof. Additionally or alternatively, UE 115-*b* may determine a downlink control channel indicating a transmission addressed to a C-RNTI of a MAC entity of UE 115-*b* has not been received on the CCs of the primary group or the secondary group, where the first active state is maintained based on the downlink control channel not being received (e.g., base station 105-*b* refrains from transmitting the downlink control channel). In some cases, the downlink control channel may be expected to be received/transmitted after receiving a random access response message as part of a random access procedure.

Additionally, in some cases, UE 115-*b* and/or base station 105-*b* may determine the first DRX configuration, the second DRX configuration, or both include DRX short cycles (e.g., DRX Short cycles) for the first DRX operation, the second DRX operation, or both. Accordingly, the above described techniques may be used for the DRX short cycles. Additionally or alternatively, the first active state for the first DRX operation associated with the DRX short cycles is independent of the second active state for the second DRX operation associated with the DRX short cycles (e.g., no coupling of active states associated with DRX Short cycles). In some cases, a configuration of DRX short cycles for the second DRX operation may be ignored or prohibited.

Figure 6:
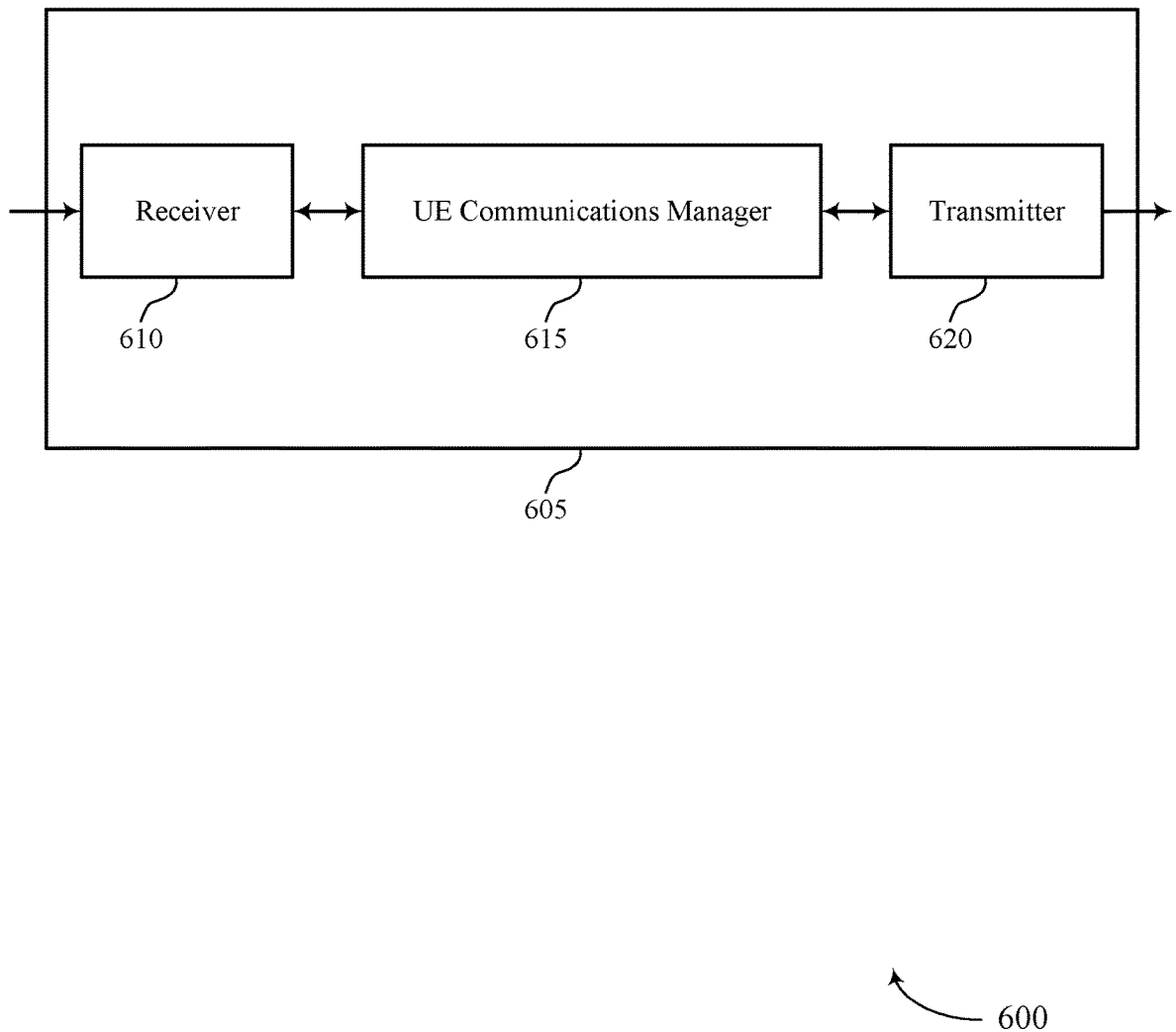
FIGS. 6 and 7 show block diagrams of devices that support semi-independent DRX groups in accordance with aspects of the present disclosure.

FIG. 6 shows a block diagram 600 of a device 605 that supports semi-independent DRX groups in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to semi-independent DRX groups, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive a first DRX configuration associated with a first DRX operation for CA communications with a base station over a primary group of CCs. Additionally, the UE communications manager 615 may receive a second DRX configuration associated with a second DRX operation for the CA communications with the base station over a secondary group of CCs. In some cases, the UE communications manager 615 may then operate in the first DRX operation and in the second DRX operation in accordance with a DRX coupling rule by which a first active state of the first DRX operation is determined based on a second active state of the second DRX operation, the second active state is determined based on the first active state, or both. The UE communications manager 615 may be an example of aspects of the UE communications manager 910 described herein.

In some examples, the UE communications manager 615 as described herein may be implemented to realize one or more potential advantages for a UE 115. For example, based on the DRX coupling rule, the UE communications manager 615 may enable the UE 115 to improve reliability that communications for a CA configuration are successfully transmitted/received based on having active states of different DRX operations coupled together. For example, any communications identified for one of the DRX operations may still be performed (e.g., the identified communications may be transmitted or received) based on active states of the different DRX operations both being on (e.g., according to the DRX coupling rule). Accordingly, the UE communications manager 615 may transmit or receive messages that would have otherwise been ignored had the active times for the different DRX operations not been coupled together, thereby improving or increasing reliability of communications for the different DRX operations.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
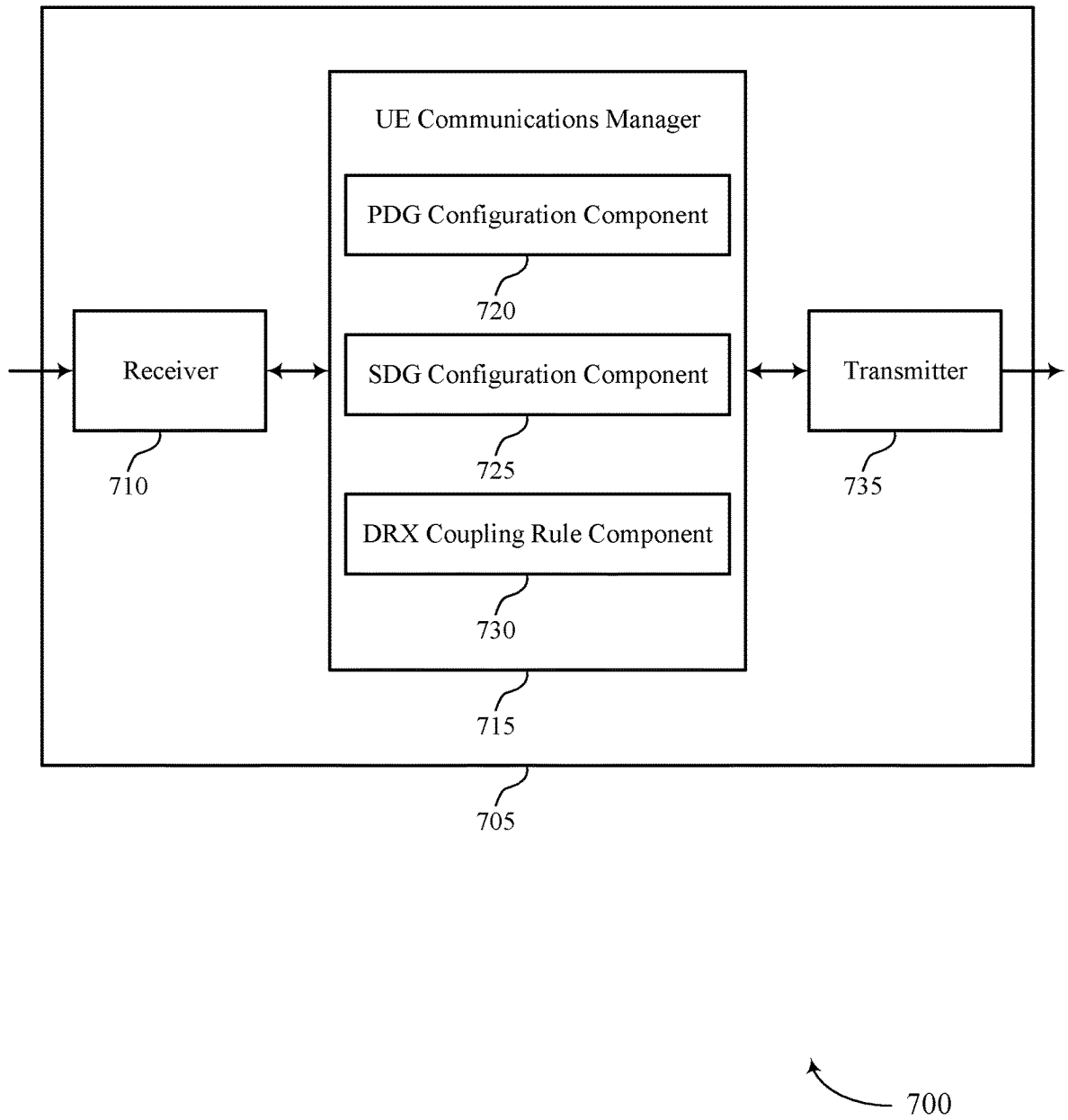

FIG. 7 shows a block diagram 700 of a device 705 that supports semi-independent DRX groups in accordance with aspects of the present disclosure. The device 705 may be an example of aspects of a device 605, or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to semi-independent DRX groups, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a PDG configuration component 720, an SDG configuration component 725, and a DRX coupling rule component 730. The UE communications manager 715 may be an example of aspects of the UE communications manager 910 described herein.

The PDG configuration component 720 may receive a first DRX configuration associated with a first DRX operation for CA communications with a base station over a primary group of CCs.

The SDG configuration component 725 may receive a second DRX configuration associated with a second DRX operation for the CA communications with the base station over a secondary group of CCs.

The DRX coupling rule component 730 may operate the UE in the first DRX operation and in the second DRX operation in accordance with a DRX coupling rule by which a first active state of the first DRX operation is determined based on a second active state of the second DRX operation, the second active state is determined based on the first active state, or both.

Based on techniques for operating in a first DRX operation and in a second DRX operation in accordance with a DRX coupling rule, a processor of a UE 115 (for example, controlling the receiver 710, the transmitter 735, or a transceiver 920 as described with reference to FIG. 9) may efficiently communicate using both the first DRX operation and the second DRX operation. For example, communications not previously received or transmitted based on one of the DRX operations being in an inactive state may now be successfully transmitted or received based on both DRX operations being in the active state together according to the DRX coupling rule. Accordingly, the processor may increase reliability and decrease latency for communications that would have previously been discarded or not transmitted without the use of the DRX coupling rule.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
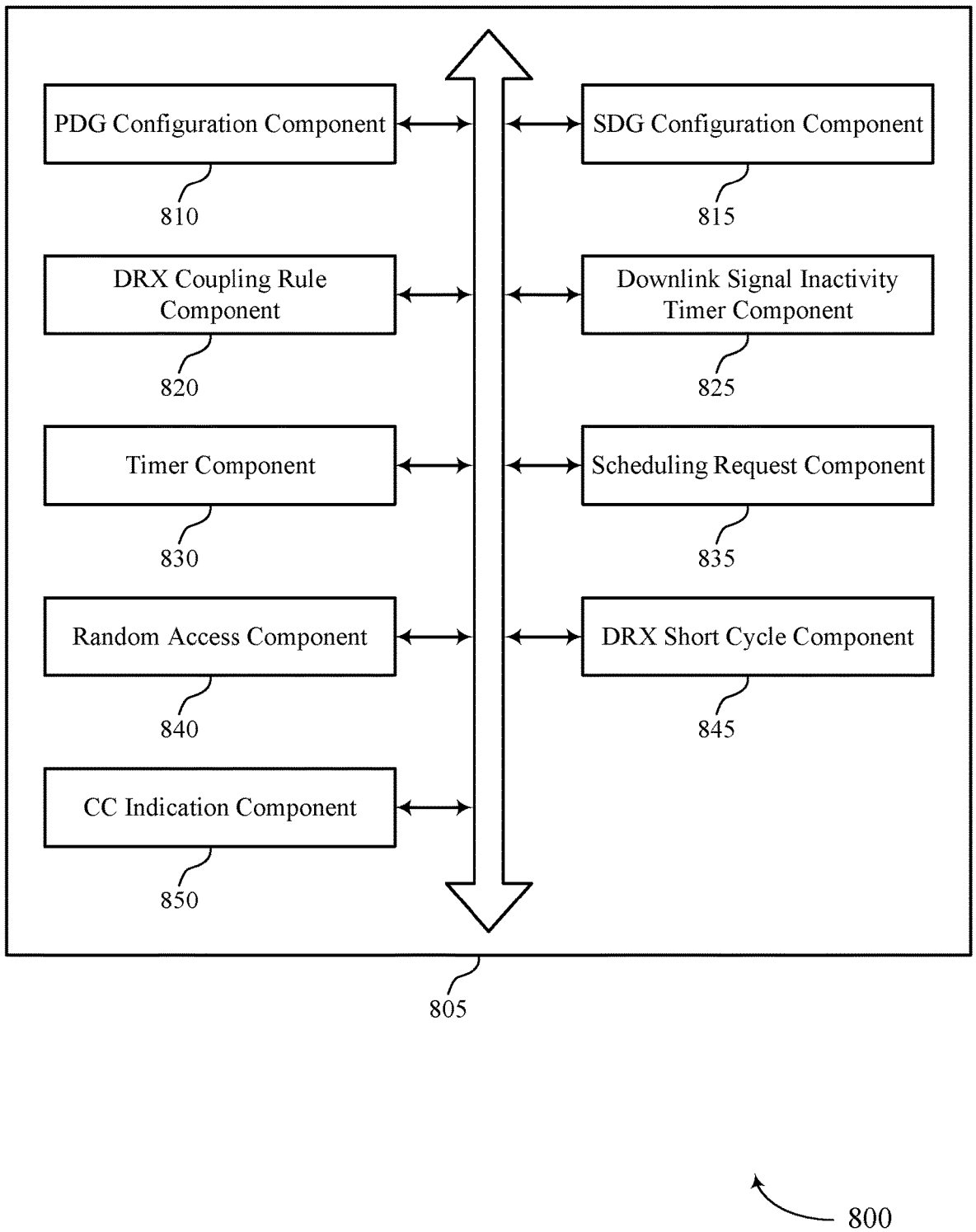
FIG. 8 shows a block diagram of a user equipment (UE) communications manager that supports semi-independent DRX groups in accordance with aspects of the present disclosure.

FIG. 8 shows a block diagram 800 of a UE communications manager 805 that supports semi-independent DRX groups in accordance with aspects of the present disclosure. The UE communications manager 805 may be an example of aspects of a UE communications manager 615, a UE communications manager 715, or a UE communications manager 910 described herein. The UE communications manager 805 may include a PDG configuration component 810, an SDG configuration component 815, a DRX coupling rule component 820, a downlink signal inactivity timer component 825, a timer component 830, a scheduling request component 835, a random access component 840, a DRX short cycle component 845, and a CC indication component 850. Each of these modules may communicate, directly or indirectly, with one another (e.g., via one or more buses).

The PDG configuration component 810 may receive a first DRX configuration associated with a first DRX operation for CA communications with a base station over a primary group of CCs. The SDG configuration component 815 may receive a second DRX configuration associated with a second DRX operation for the CA communications with the base station over a secondary group of CCs.

In some cases, the first DRX configuration, the second DRX configuration, or both may be received via higher layer signaling. Additionally, the primary group may be a PDG, and the secondary group may be an SDG. In some cases, the first DRX configuration, the second DRX configuration, or both include a CDRX configuration defined per MAC entity across the CCs of the primary group and the CCs of the secondary group for the CA communications. Additionally, the CCs of the primary group and the CCs of the secondary group may be in a same or different frequency range, may have a same or different numerology, or a combination thereof.

The DRX coupling rule component 820 may operate the UE in the first DRX operation and in the second DRX operation in accordance with a DRX coupling rule by which a first active state of the first DRX operation is determined based on a second active state of the second DRX operation, the second active state is determined based on the first active state, or both. In some examples, the DRX coupling rule component 820 may determine the first active state of the first DRX operation has expired and may stop the second active state of the second DRX operation based on the first active state expiring.

The downlink signal inactivity timer component 825 may receive, from the base station on one or more CCs of the secondary group, a downlink signal during the second active state of the second DRX operation and may determine to start or restart a first inactivity timer for the primary group and a second inactivity timer for the secondary group based on receiving the downlink signal on the one or more CCs of the secondary group in accordance with the DRX overlap rule. Additionally or alternatively, the downlink signal inactivity timer component 825 may receive, from the base station on one or more CCs of the primary group, a downlink signal during the first active state of the first DRX operation and may determine to start or restart a first inactivity timer for the primary group based on receiving the downlink signal on the one or more CCs of the primary group, where a second inactivity timer for the secondary group is not started or restarted after the downlink signal is received on the one or more CCs of the primary group. In some cases, the downlink signal may include a PDCCH that indicates a new data transmission over a downlink or uplink shared channel.

The timer component 830 may determine that a timer associated with the first active state, the second active state, or both is running for each of the primary group and the secondary group, where the first active state is maintained based on the timer running for each of the primary group and the secondary group. In some examples, the timer component 830 may determine that the first active state is maintained based on the timer for the second active state is running, where the timer for the first active state is not running at a same instance as the timer for the second active state is running. Subsequently, the timer component 830 may refrain from monitoring for a downlink signal on the primary group and may transmit an uplink signal on the primary group based on the determination that the first active state is maintained based at least in part on the timer for the second active state is running while the timer for the first active state is not running. In some cases, the timer associated with the first active state, the second active state, or both may include an on duration timer, an inactivity timer, a downlink retransmission timer, an uplink retransmission timer, a contention resolution timer, or a combination thereof.

The scheduling request component 835 may transmit, to the base station, a scheduling request in an uplink control channel and may determine to maintain the first active state during a pending duration for the scheduling request, the pending duration including a duration where the UE is waiting for a downlink control channel from the base station in response to the scheduling request. In some cases, the scheduling request is transmitted on one or more CCs of the primary group, one or more CCs of the secondary group, or a combination thereof.

The random access component 840 may determine a downlink control channel indicating a transmission addressed to a identifier-RNTI of a MAC entity of the UE has not been received on the CCs of the primary group or the secondary group, where the first active state is maintained based on the downlink control channel not being received. In some cases, the downlink control channel may be expected to be received after receiving a random access response message as part of a random access procedure.

The DRX short cycle component 845 may determine the first DRX configuration, the second DRX configuration, or both include DRX short cycles for the first DRX operation, the second DRX operation, or both. In some cases, the first active state for the first DRX operation associated with the DRX short cycles may be independent of the second active state for the second DRX operation associated with the DRX short cycles. Additionally or alternatively, a configuration of DRX short cycles for the second DRX operation may be ignored or prohibited.

The CC indication component 850 may receive, via higher layer signaling, an indication of the CCs to be included the primary group, the CCs to be included the secondary group, or a combination thereof.

Figure 9:
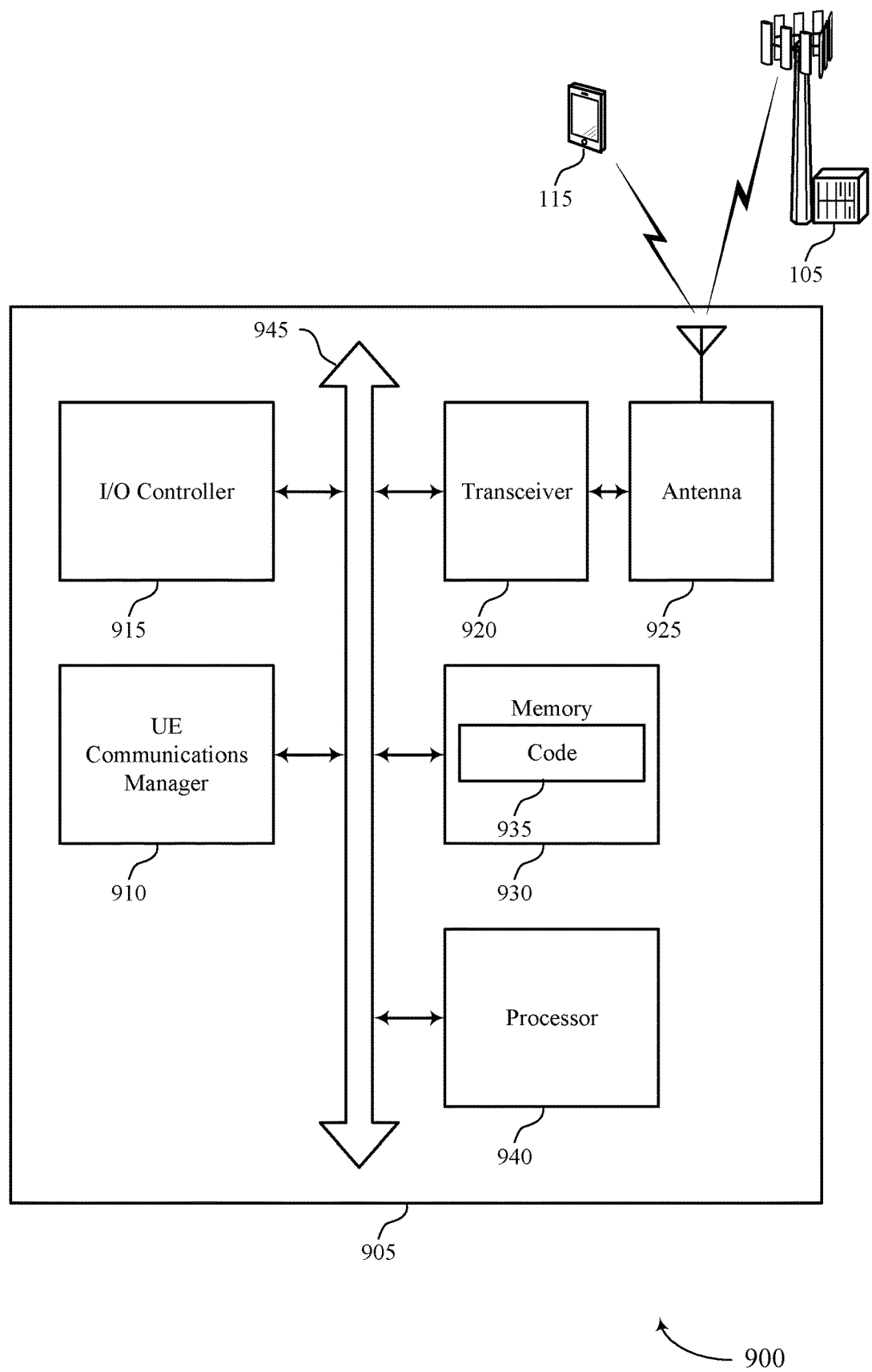
FIG. 9 shows a diagram of a system including a device that supports semi-independent DRX groups in accordance with aspects of the present disclosure.

FIG. 9 shows a diagram of a system 900 including a device 905 that supports semi-independent DRX groups in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive a first DRX configuration associated with a first DRX operation for CA communications with a base station over a primary group of CCs. Additionally, the UE communications manager 910 may receive a second DRX configuration associated with a second DRX operation for the CA communications with the base station over a secondary group of CCs. In some cases, the UE communications manager 910 may then operate in the first DRX operation and in the second DRX operation in accordance with a DRX coupling rule by which a first active state of the first DRX operation is determined based on a second active state of the second DRX operation, the second active state is determined based on the first active state, or both.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting semi-independent DRX groups).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
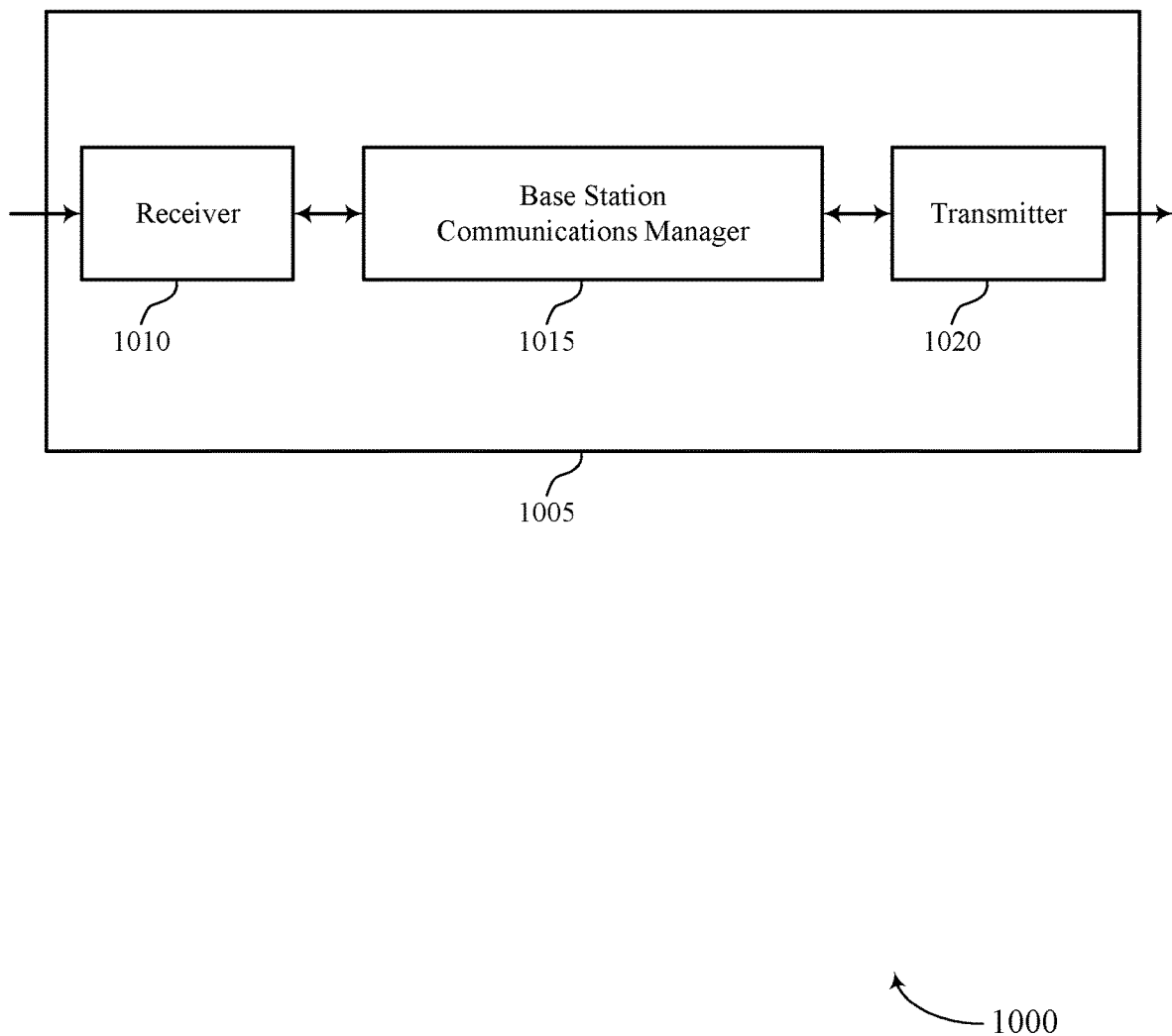
FIGS. 10 and 11 show block diagrams of devices that support semi-independent DRX groups in accordance with aspects of the present disclosure.

FIG. 10 shows a block diagram 1000 of a device 1005 that supports semi-independent DRX groups in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to semi-independent DRX groups, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit a first DRX configuration associated with a first DRX operation for CA communications with a UE over a primary group of CCs. Additionally, the base station communications manager 1015 may transmit a second DRX configuration associated with a second DRX operation for CA communications with the UE over a secondary group of CCs. In some cases, the base station communications manager 1015 may then operate in the first DRX operation and in the second DRX operation in accordance with a DRX coupling rule by which a first active state of the first DRX operation is determined based on a second active state of the second DRX operation, the second active state is determined based on the first active state, or both. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
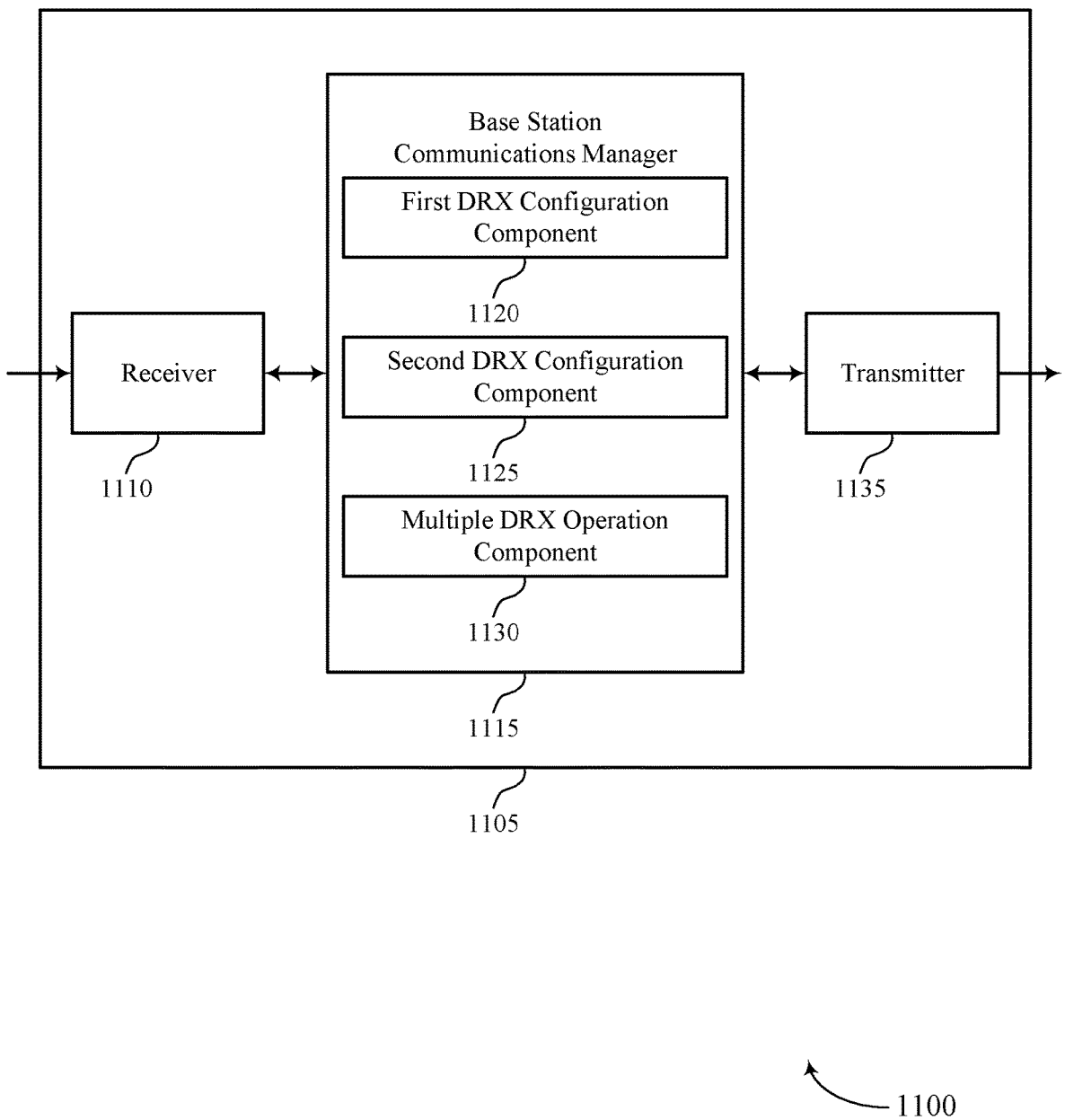

FIG. 11 shows a block diagram 1100 of a device 1105 that supports semi-independent DRX groups in accordance with aspects of the present disclosure. The device 1105 may be an example of aspects of a device 1005, or a base station 105 as described herein. The device 1105 may include a receiver 1110, a base station communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to semi-independent DRX groups, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a first DRX configuration component 1120, a second DRX configuration component 1125, and a multiple DRX operation component 1130. The base station communications manager 1115 may be an example of aspects of the base station communications manager 1310 described herein.

The first DRX configuration component 1120 may transmit a first DRX configuration associated with a first DRX operation for CA communications with a UE over a primary group of CCs.

The second DRX configuration component 1125 may transmit a second DRX configuration associated with a second DRX operation for CA communications with the UE over a secondary group of CCs.

The multiple DRX operation component 1130 may operate the base station in the first DRX operation and in the second DRX operation in accordance with a DRX coupling rule by which a first active state of the first DRX operation is determined based on a second active state of the second DRX operation, the second active state is determined based on the first active state, or both.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
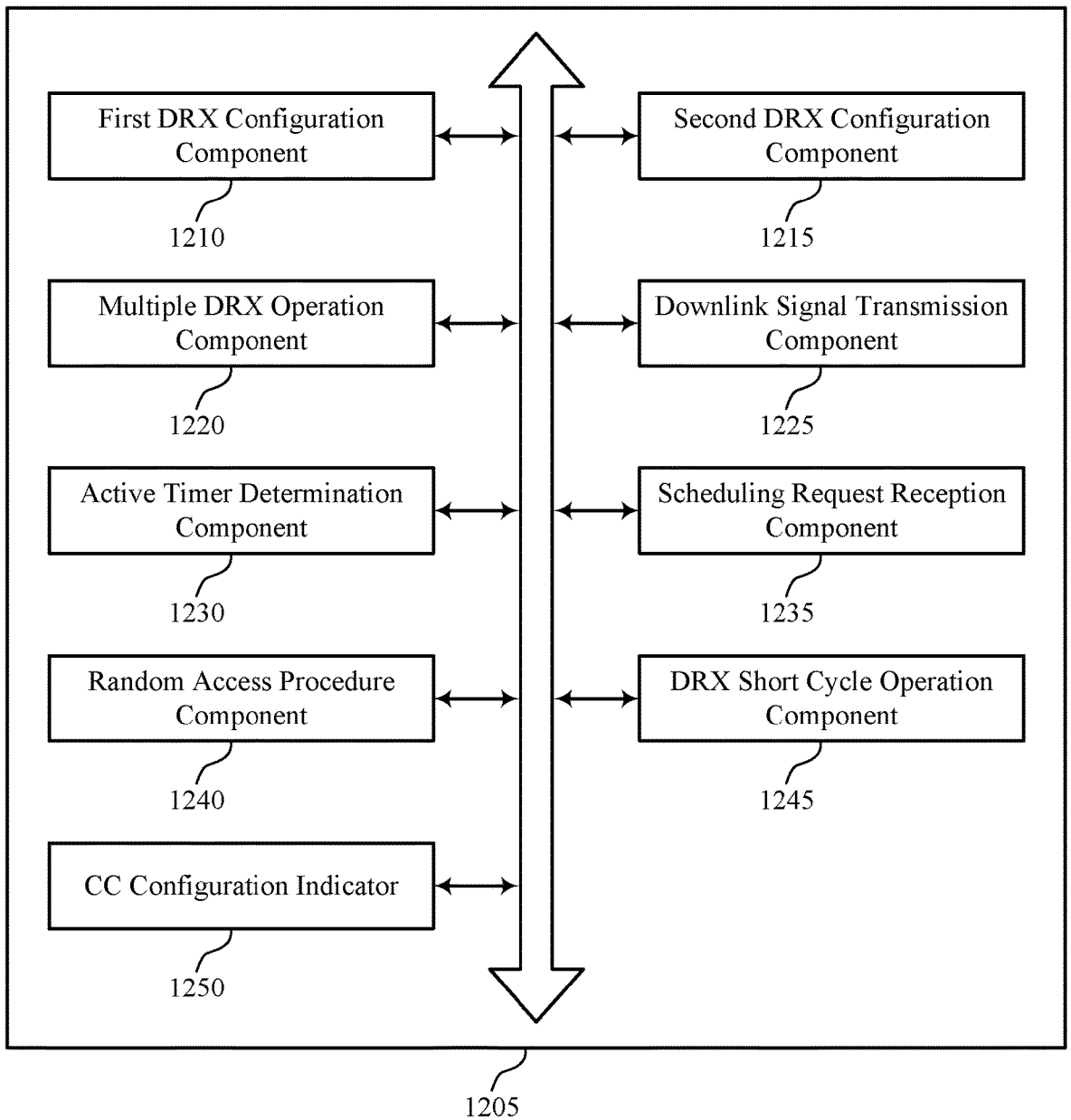
FIG. 12 shows a block diagram of a base station communications manager that supports semi-independent DRX groups in accordance with aspects of the present disclosure.

FIG. 12 shows a block diagram 1200 of a base station communications manager 1205 that supports semi-independent DRX groups in accordance with aspects of the present disclosure. The base station communications manager 1205 may be an example of aspects of a base station communications manager 1015, a base station communications manager 1115, or a base station communications manager 1310 described herein. The base station communications manager 1205 may include a first DRX configuration component 1210, a second DRX configuration component 1215, a multiple DRX operation component 1220, a downlink signal transmission component 1225, an active timer determination component 1230, a scheduling request reception component 1235, a random access procedure component 1240, a DRX short cycle operation component 1245, and a CC configuration indicator 1250. Each of these modules may communicate, directly or indirectly, with one another (e.g., via one or more buses).

The first DRX configuration component 1210 may transmit a first DRX configuration associated with a first DRX operation for CA communications with a UE over a primary group of CCs. The second DRX configuration component 1215 may transmit a second DRX configuration associated with a second DRX operation for CA communications with the UE over a secondary group of CCs.

In some cases, the first DRX configuration, the second DRX configuration, or both may be transmitted via higher layer signaling. Additionally, the primary group may be a PDG, and the secondary group may be an SDG. In some cases, the first DRX configuration, the second DRX configuration, or both include a CDRX configuration defined per MAC entity across the CCs of the primary group and the CCs of the secondary group for the CA communications. Additionally, the CCs of the primary group and the CCs of the secondary group may be in a same or different frequency range, may have a same or different numerology, or a combination thereof.

The multiple DRX operation component 1220 may operate the base station in the first DRX operation and in the second DRX operation in accordance with a DRX coupling rule by which a first active state of the first DRX operation is determined based on a second active state of the second DRX operation, the second active state is determined based on the first active state, or both. In some examples, the multiple DRX operation component 1220 may determine the first active state of the first DRX operation has expired and may stop the second active state of the second DRX operation based on the first active state expiring.

The downlink signal transmission component 1225 may transmit, to the UE on one or more CCs of the secondary group, a downlink signal during the second active state of the second DRX operation and may determine to start or restart a first inactivity timer for the primary group and a second inactivity timer for the secondary group based on transmitting the downlink signal on the one or more CCs of the secondary group in accordance with the DRX overlap rule. Additionally or alternatively, the downlink signal transmission component 1225 may transmit, to the UE on one or more CCs of the primary group, a downlink signal during the first active state of the first DRX operation and may determine to start or restart a first inactivity timer for the primary group based on transmitting the downlink signal on the one or more CCs of the primary group, where a second inactivity timer for the secondary group is not started or restarted after the downlink signal is received on the one or more CCs of the primary group. In some cases, the downlink signal may include a PDCCH that indicates a new data transmission over a downlink or uplink shared channel.

The active timer determination component 1230 may determine that a timer associated with the first active state, the second active state, or both is running for each of the primary group and the secondary group, where the first active state is maintained based on the timer running for each of the primary group and the secondary group. In some cases, the timer associated with the first active state, the second active state, or both may include an on duration timer, an inactivity timer, a downlink retransmission timer, an uplink retransmission timer, a contention resolution timer, or a combination thereof.

The scheduling request reception component 1235 may receive, from the UE, a scheduling request in an uplink control channel and may determine to maintain the first active state during a pending duration for the scheduling request, the pending duration including a duration where the UE is waiting for a downlink control channel from the base station in response to the scheduling request. In some cases, the scheduling request may be received on one or more CCs of the primary group, one or more CCs of the secondary group, or a combination thereof.

The random access procedure component 1240 may refrain from transmitting a downlink control channel indicating a transmission addressed to a C-RNTI of a MAC entity of the UE, where the first active state is maintained based on the downlink control channel not being transmitted. In some cases, the downlink control channel may be expected to be transmitted after receiving a random access response message as part of a random access procedure.

The DRX short cycle operation component 1245 may determine the first DRX configuration, the second DRX configuration, or both include DRX short cycles for the first DRX operation, the second DRX operation, or both. In some cases, the first active state for the first DRX operation associated with the DRX short cycles may be independent of the second active state for the second DRX operation associated with the DRX short cycles. Additionally or alternatively, a configuration of DRX short cycles for the second DRX operation may be ignored or prohibited.

The CC configuration indicator 1250 may transmit, via higher layer signaling, an indication of the CCs to be included the primary group, the CCs to be included the secondary group, or a combination thereof.

Figure 13:
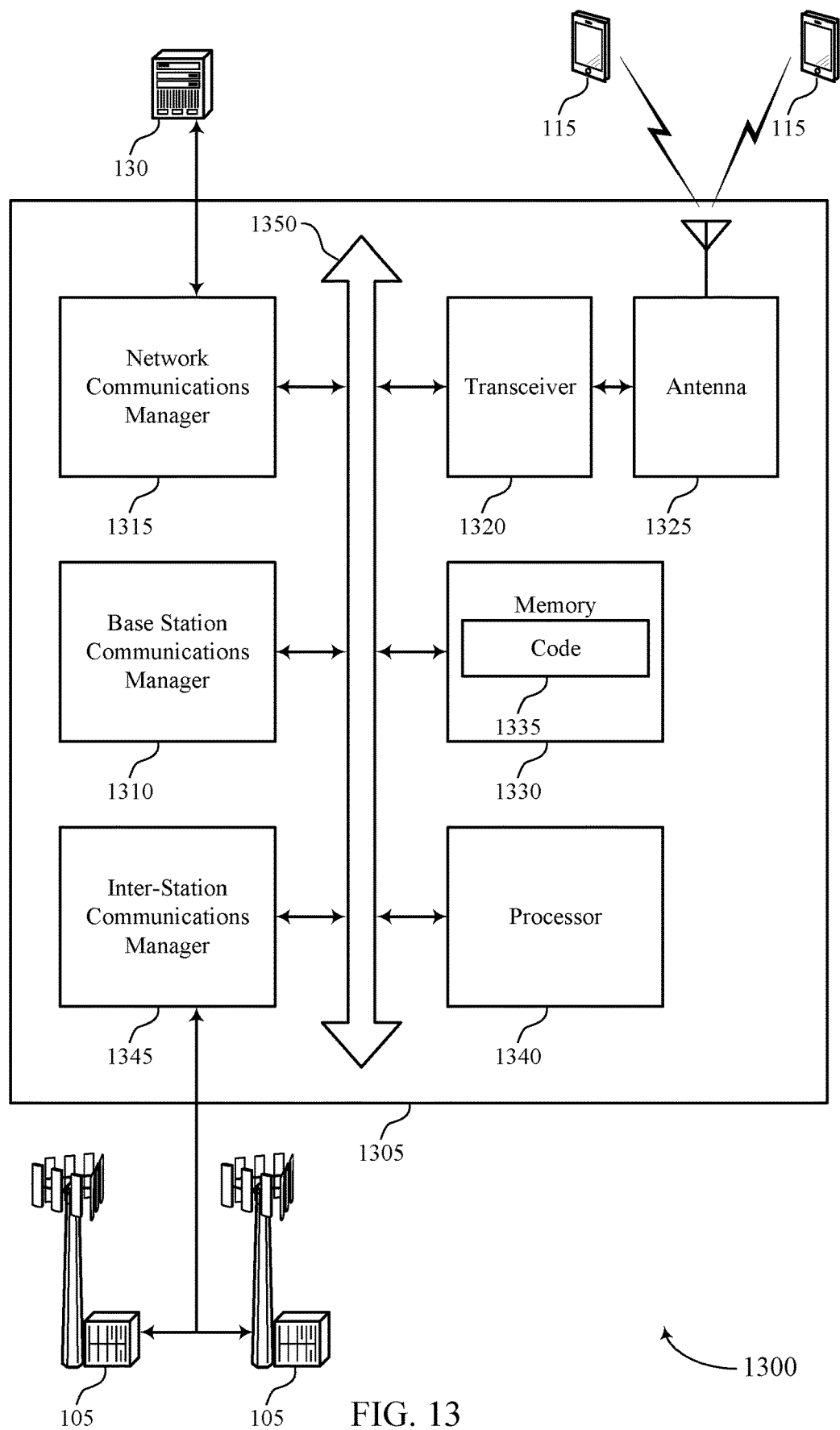
FIG. 13 shows a diagram of a system including a device that supports semi-independent DRX groups in accordance with aspects of the present disclosure.

FIG. 13 shows a diagram of a system 1300 including a device 1305 that supports semi-independent DRX groups in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit a first DRX configuration associated with a first DRX operation for CA communications with a UE over a primary group of CCs. Additionally, the base station communications manager 1310 may transmit a second DRX configuration associated with a second DRX operation for CA communications with the UE over a secondary group of CCs. In some cases, the base station communications manager 1310 may operate the base station in the first DRX operation and in the second DRX operation in accordance with a DRX coupling rule by which a first active state of the first DRX operation is determined based on a second active state of the second DRX operation, the second active state is determined based on the first active state, or both.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting semi-independent DRX groups).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
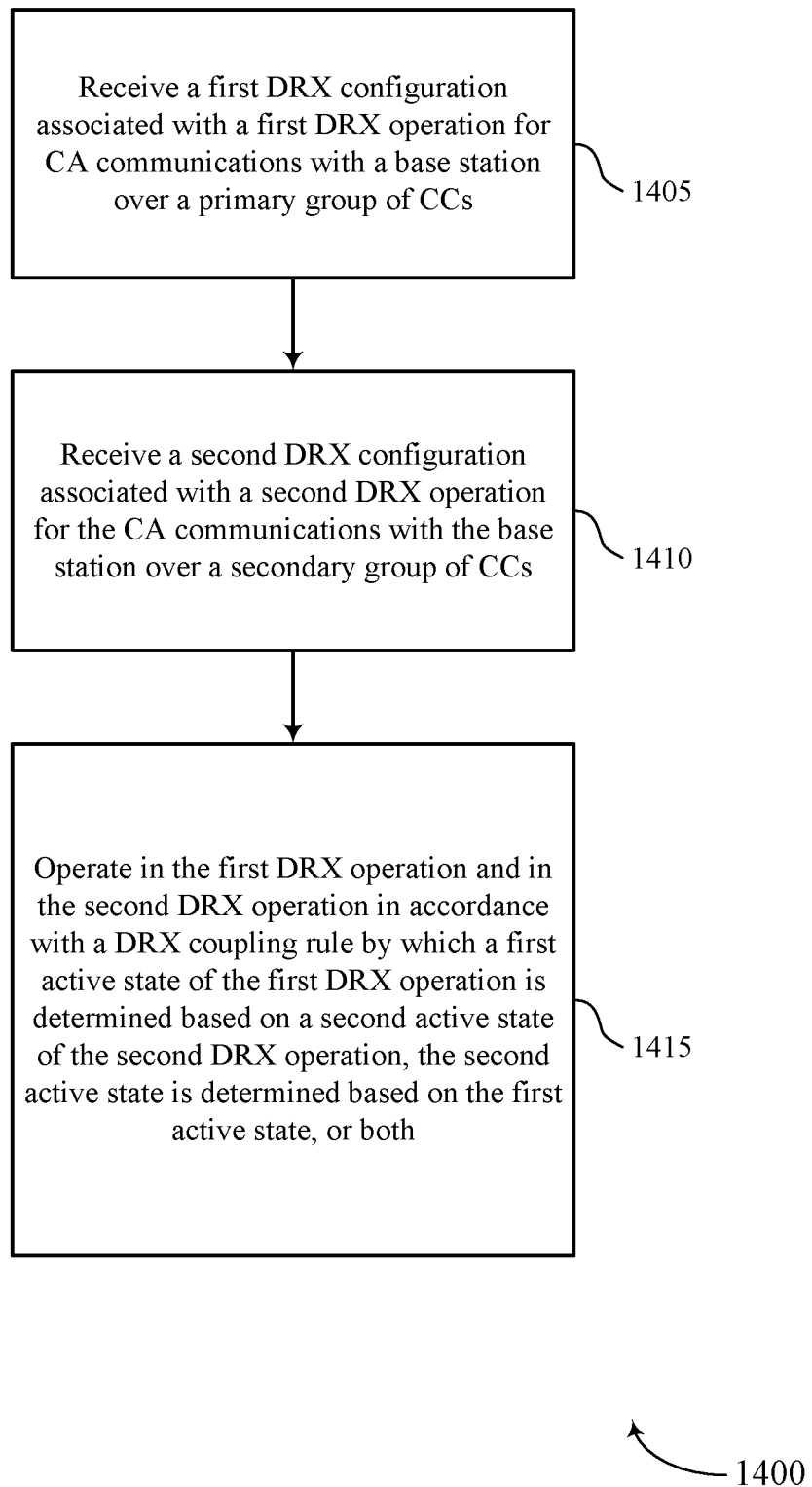
FIGS. 14 through 20 show flowcharts illustrating methods that support semi-independent DRX groups in accordance with aspects of the present disclosure.

FIG. 14 shows a flowchart illustrating a method 1400 that supports semi-independent DRX groups in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first DRX configuration associated with a first DRX operation for CA communications with a base station over a primary group of CCs. The operations of 1405 may be performed according to the methods described herein. In some examples, aspects of the operations of 1405 may be performed by a PDG configuration component as described with reference to FIGS. 6 through 9.

At 1410, the UE may receive a second DRX configuration associated with a second DRX operation for the CA communications with the base station over a secondary group of CCs. The operations of 1410 may be performed according to the methods described herein. In some examples, aspects of the operations of 1410 may be performed by an SDG configuration component as described with reference to FIGS. 6 through 9.

At 1415, the UE may operate in the first DRX operation and in the second DRX operation in accordance with a DRX coupling rule by which a first active state of the first DRX operation is determined based on a second active state of the second DRX operation, the second active state is determined based on the first active state, or both. The operations of 1415 may be performed according to the methods described herein. In some examples, aspects of the operations of 1415 may be performed by a DRX coupling rule component as described with reference to FIGS. 6 through 9.

Figure 15:
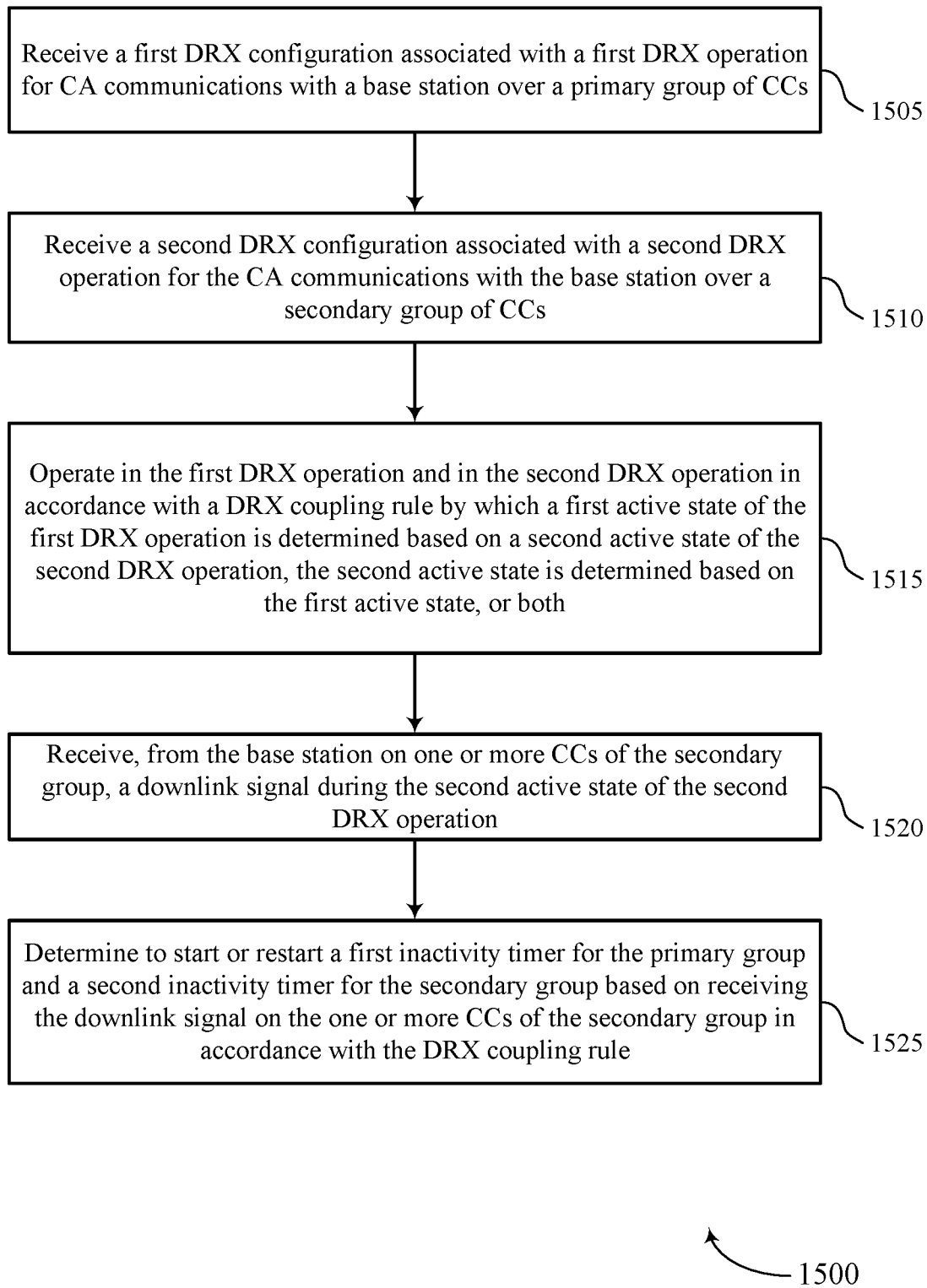

FIG. 15 shows a flowchart illustrating a method 1500 that supports semi-independent DRX groups in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a first DRX configuration associated with a first DRX operation for CA communications with a base station over a primary group of CCs. The operations of 1505 may be performed according to the methods described herein. In some examples, aspects of the operations of 1505 may be performed by a PDG configuration component as described with reference to FIGS. 6 through 9.

At 1510, the UE may receive a second DRX configuration associated with a second DRX operation for the CA communications with the base station over a secondary group of CCs. The operations of 1510 may be performed according to the methods described herein. In some examples, aspects of the operations of 1510 may be performed by an SDG configuration component as described with reference to FIGS. 6 through 9.

At 1515, the UE may operate in the first DRX operation and in the second DRX operation in accordance with a DRX coupling rule by which a first active state of the first DRX operation is determined based on a second active state of the second DRX operation, the second active state is determined based on the first active state, or both. The operations of 1515 may be performed according to the methods described herein. In some examples, aspects of the operations of 1515 may be performed by a DRX coupling rule component as described with reference to FIGS. 6 through 9.

At 1520, the UE may receive, from the base station on one or more CCs of the secondary group, a downlink signal during the second active state of the second DRX operation. The operations of 1520 may be performed according to the methods described herein. In some examples, aspects of the operations of 1520 may be performed by a downlink signal inactivity timer component as described with reference to FIGS. 6 through 9.

At 1525, the UE may determine to start or restart a first inactivity timer for the primary group and a second inactivity timer for the secondary group based on receiving the downlink signal on the one or more CCs of the secondary group in accordance with the DRX overlap rule. The operations of 1525 may be performed according to the methods described herein. In some examples, aspects of the operations of 1525 may be performed by a downlink signal inactivity timer component as described with reference to FIGS. 6 through 9.

Figure 16:
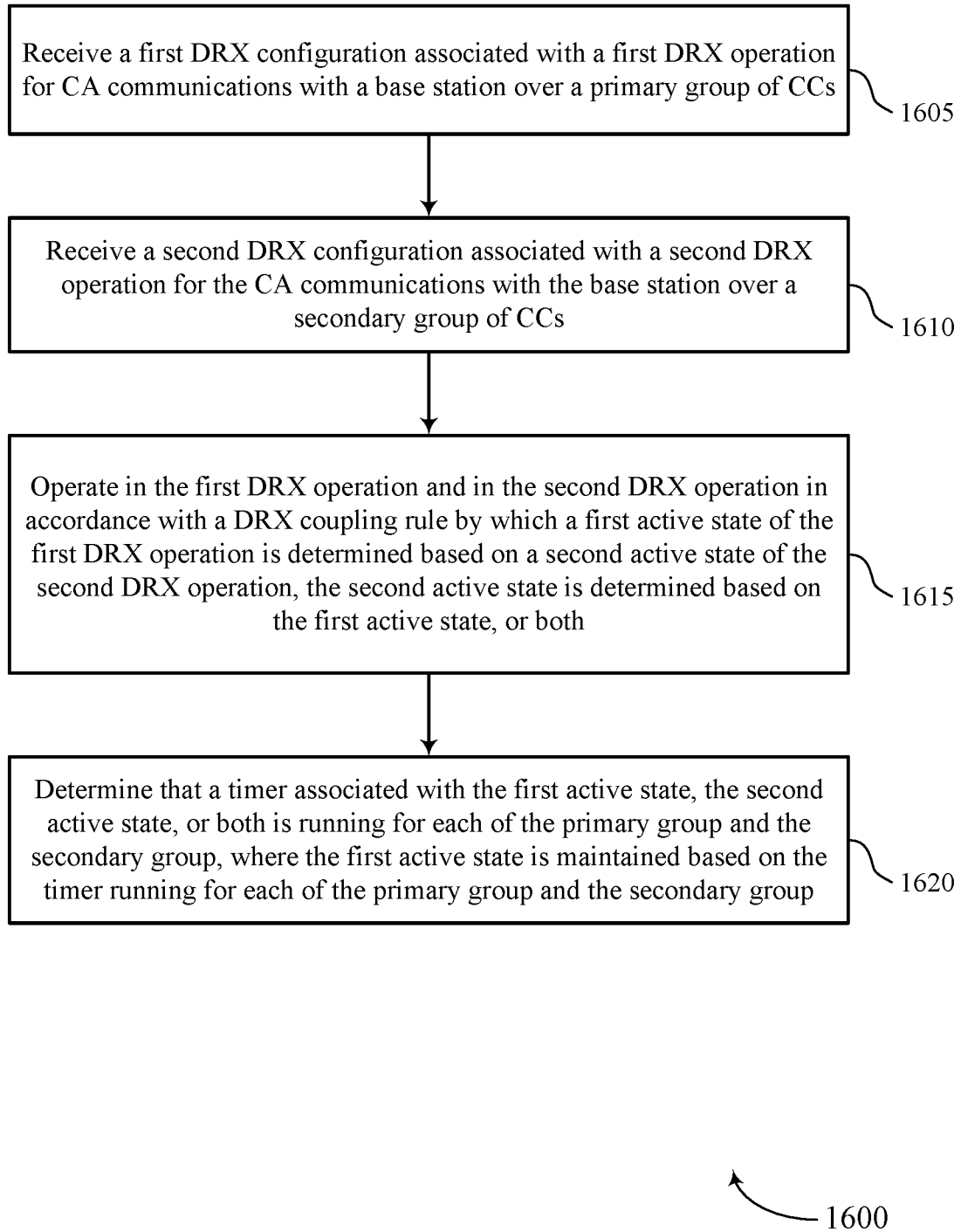

FIG. 16 shows a flowchart illustrating a method 1600 that supports semi-independent DRX groups in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a first DRX configuration associated with a first DRX operation for CA communications with a base station over a primary group of CCs. The operations of 1605 may be performed according to the methods described herein. In some examples, aspects of the operations of 1605 may be performed by a PDG configuration component as described with reference to FIGS. 6 through 9.

At 1610, the UE may receive a second DRX configuration associated with a second DRX operation for the CA communications with the base station over a secondary group of CCs. The operations of 1610 may be performed according to the methods described herein. In some examples, aspects of the operations of 1610 may be performed by an SDG configuration component as described with reference to FIGS. 6 through 9.

At 1615, the UE may operate in the first DRX operation and in the second DRX operation in accordance with a DRX coupling rule by which a first active state of the first DRX operation is determined based on a second active state of the second DRX operation, the second active state is determined based on the first active state, or both. The operations of 1615 may be performed according to the methods described herein. In some examples, aspects of the operations of 1615 may be performed by a DRX coupling rule component as described with reference to FIGS. 6 through 9.

At 1620, the UE may determine that a timer associated with the first active state, the second active state, or both is running for each of the primary group and the secondary group, where the first active state is maintained based on the timer running for each of the primary group and the secondary group. The operations of 1620 may be performed according to the methods described herein. In some examples, aspects of the operations of 1620 may be performed by a timer component as described with reference to FIGS. 6 through 9.

Figure 17:
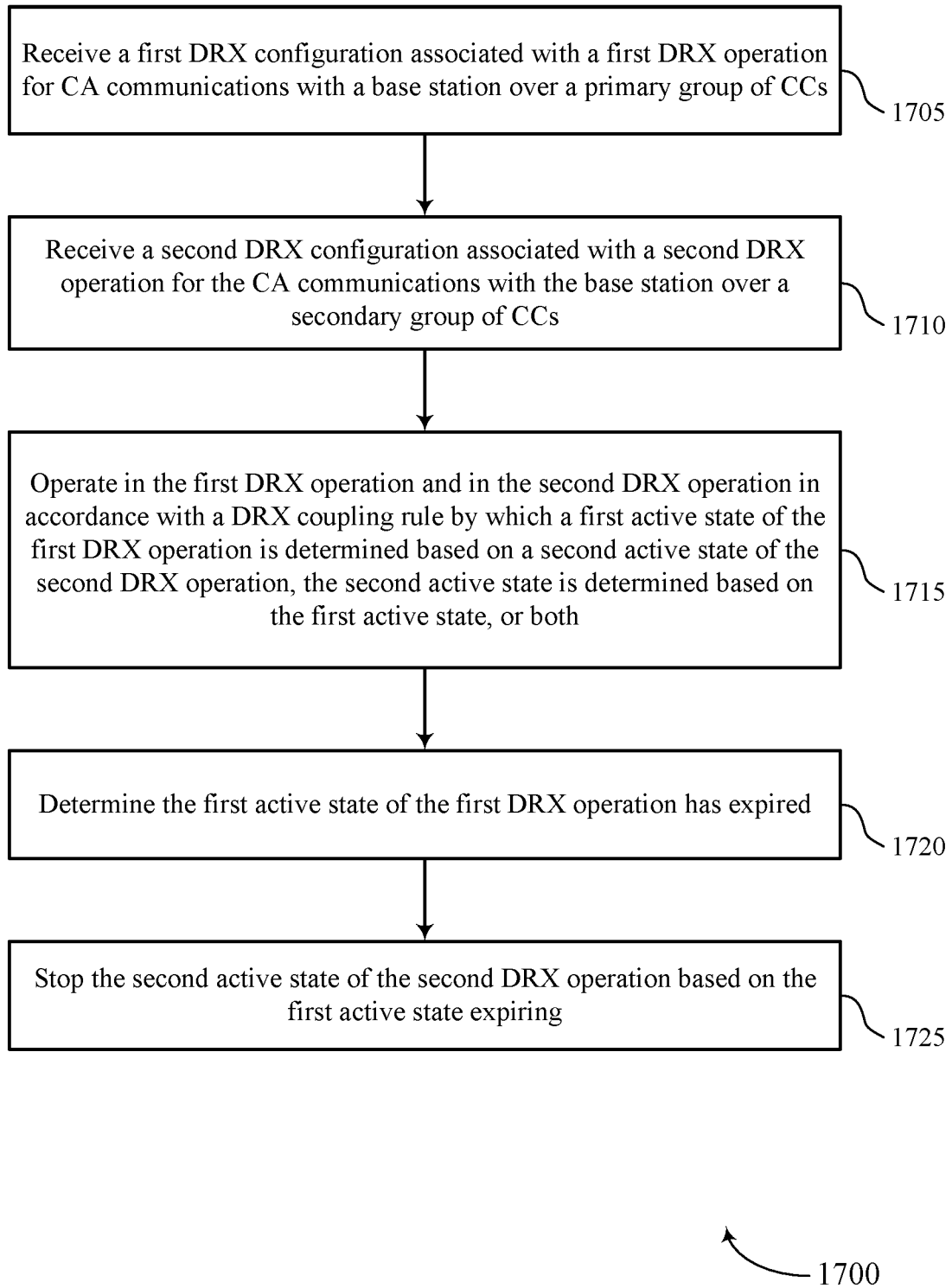

FIG. 17 shows a flowchart illustrating a method 1700 that supports semi-independent DRX groups in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive a first DRX configuration associated with a first DRX operation for CA communications with a base station over a primary group of CCs. The operations of 1705 may be performed according to the methods described herein. In some examples, aspects of the operations of 1705 may be performed by a PDG configuration component as described with reference to FIGS. 6 through 9.

At 1710, the UE may receive a second DRX configuration associated with a second DRX operation for the CA communications with the base station over a secondary group of CCs. The operations of 1710 may be performed according to the methods described herein. In some examples, aspects of the operations of 1710 may be performed by an SDG configuration component as described with reference to FIGS. 6 through 9.

At 1715, the UE may operate in the first DRX operation and in the second DRX operation in accordance with a DRX coupling rule by which a first active state of the first DRX operation is determined based on a second active state of the second DRX operation, the second active state is determined based on the first active state, or both. The operations of 1715 may be performed according to the methods described herein. In some examples, aspects of the operations of 1715 may be performed by a DRX coupling rule component as described with reference to FIGS. 6 through 9.

At 1720, the UE may determine the first active state of the first DRX operation has expired. The operations of 1720 may be performed according to the methods described herein. In some examples, aspects of the operations of 1720 may be performed by a DRX coupling rule component as described with reference to FIGS. 6 through 9.

At 1725, the UE may stop the second active state of the second DRX operation based on the first active state expiring. The operations of 1725 may be performed according to the methods described herein. In some examples, aspects of the operations of 1725 may be performed by a DRX coupling rule component as described with reference to FIGS. 6 through 9.

Figure 18:
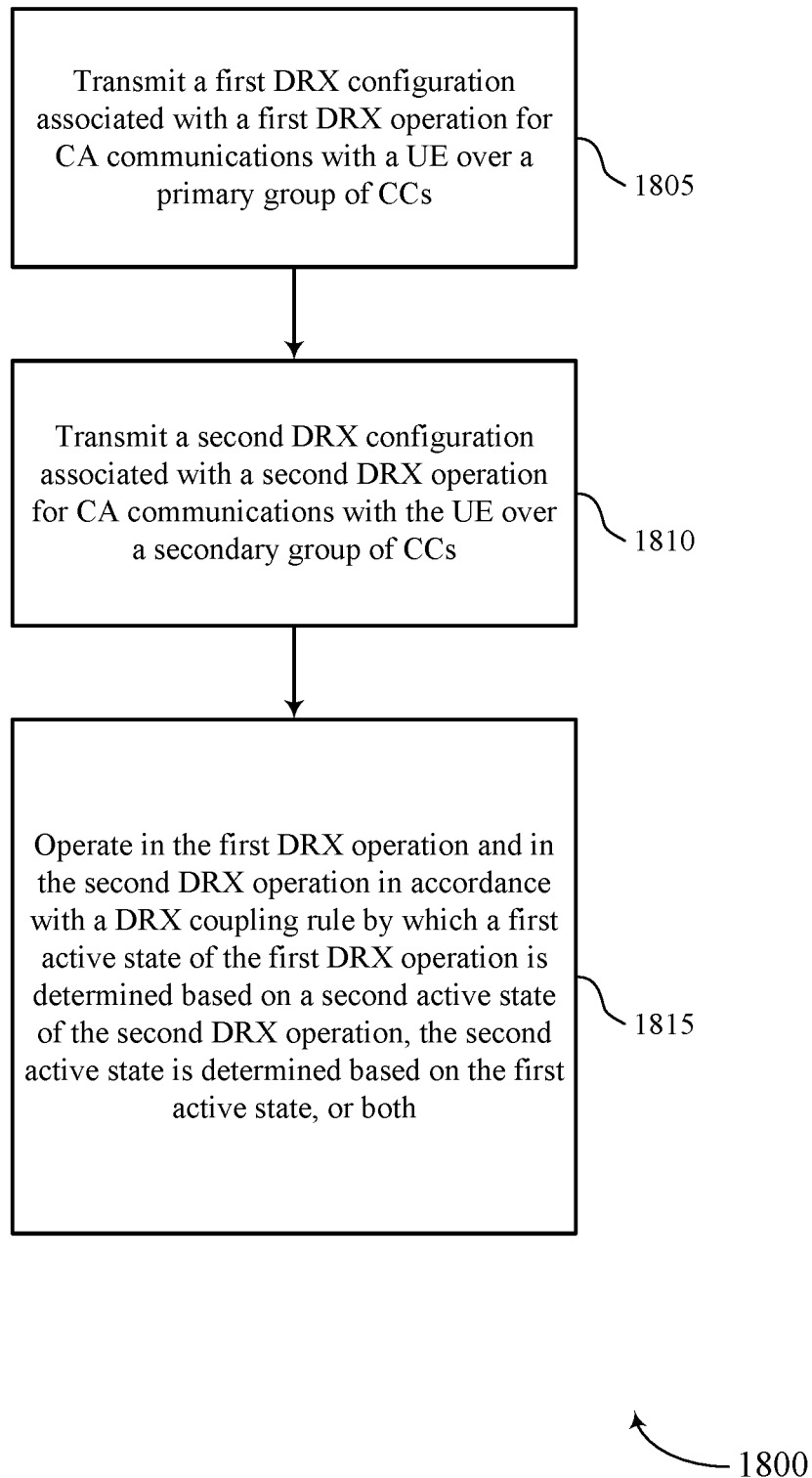

FIG. 18 shows a flowchart illustrating a method 1800 that supports semi-independent DRX groups in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit a first DRX configuration associated with a first DRX operation for CA communications with a UE over a primary group of CCs. The operations of 1805 may be performed according to the methods described herein. In some examples, aspects of the operations of 1805 may be performed by a first DRX configuration component as described with reference to FIGS. 10 through 13.

At 1810, the base station may transmit a second DRX configuration associated with a second DRX operation for CA communications with the UE over a secondary group of CCs. The operations of 1810 may be performed according to the methods described herein. In some examples, aspects of the operations of 1810 may be performed by a second DRX configuration component as described with reference to FIGS. 10 through 13.

At 1815, the base station may operate in the first DRX operation and in the second DRX operation in accordance with a DRX coupling rule by which a first active state of the first DRX operation is determined based on a second active state of the second DRX operation, the second active state is determined based on the first active state, or both. The operations of 1815 may be performed according to the methods described herein. In some examples, aspects of the operations of 1815 may be performed by a multiple DRX operation component as described with reference to FIGS. 10 through 13.

Figure 19:
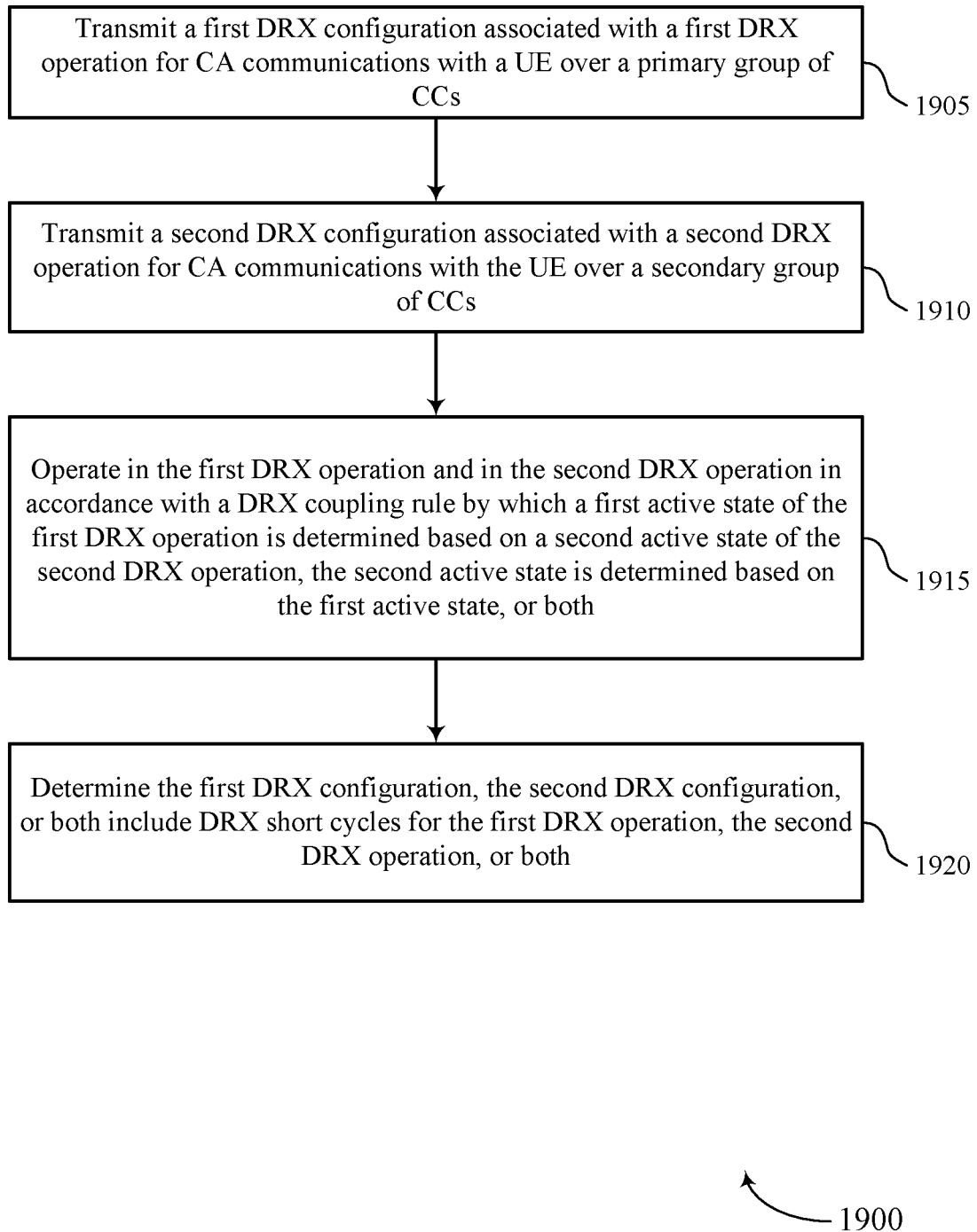

FIG. 19 shows a flowchart illustrating a method 1900 that supports semi-independent DRX groups in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit a first DRX configuration associated with a first DRX operation for CA communications with a UE over a primary group of CCs. The operations of 1905 may be performed according to the methods described herein. In some examples, aspects of the operations of 1905 may be performed by a first DRX configuration component as described with reference to FIGS. 10 through 13.

At 1910, the base station may transmit a second DRX configuration associated with a second DRX operation for CA communications with the UE over a secondary group of CCs. The operations of 1910 may be performed according to the methods described herein. In some examples, aspects of the operations of 1910 may be performed by a second DRX configuration component as described with reference to FIGS. 10 through 13.

At 1915, the base station may operate in the first DRX operation and in the second DRX operation in accordance with a DRX coupling rule by which a first active state of the first DRX operation is determined based on a second active state of the second DRX operation, the second active state is determined based on the first active state, or both. The operations of 1915 may be performed according to the methods described herein. In some examples, aspects of the operations of 1915 may be performed by a multiple DRX operation component as described with reference to FIGS. 10 through 13.

At 1920, the base station may determine the first DRX configuration, the second DRX configuration, or both include DRX short cycles for the first DRX operation, the second DRX operation, or both. The operations of 1920 may be performed according to the methods described herein. In some examples, aspects of the operations of 1920 may be performed by a DRX short cycle operation component as described with reference to FIGS. 10 through 13.

Figure 20:
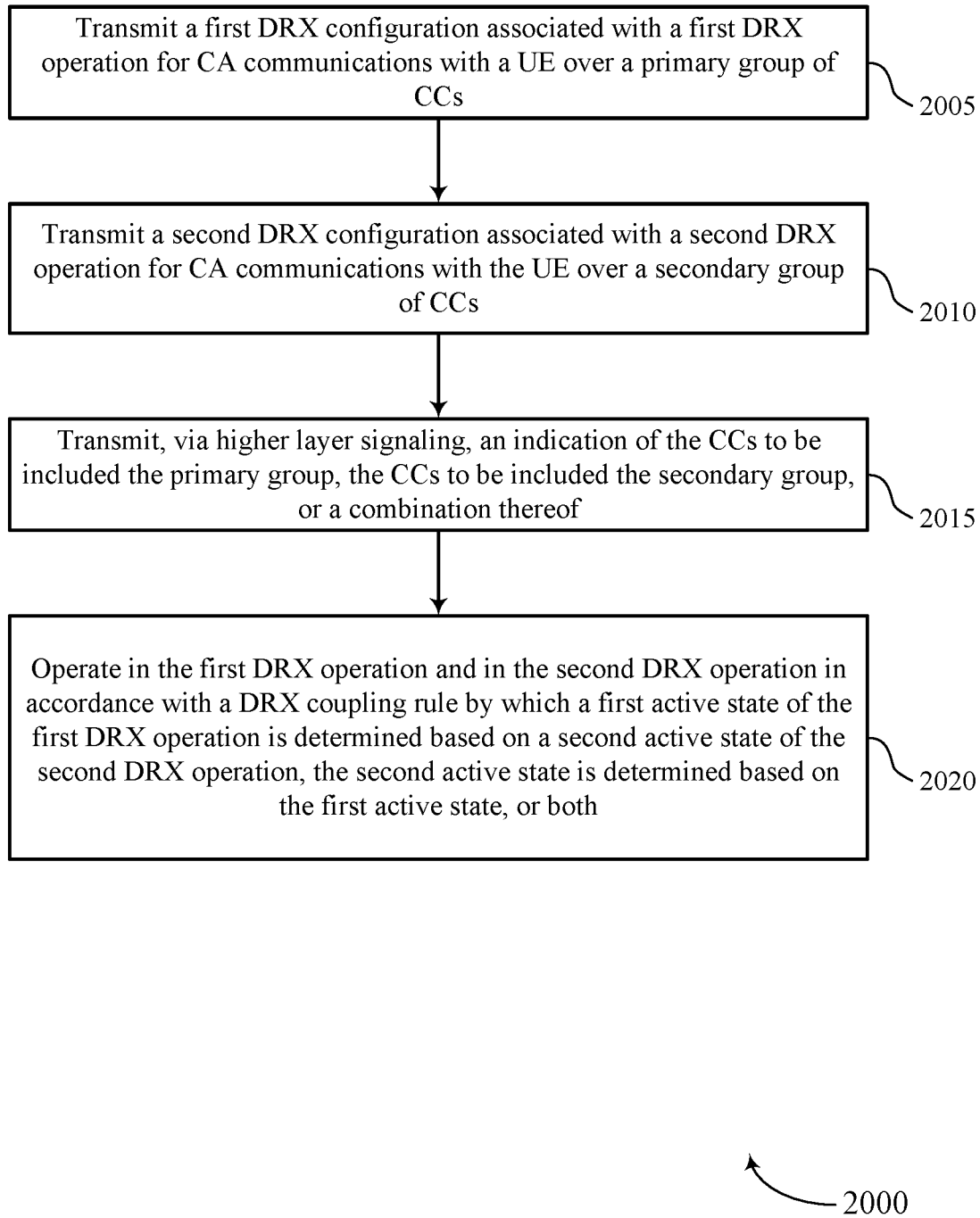

FIG. 20 shows a flowchart illustrating a method 2000 that supports semi-independent DRX groups in accordance with aspects of the present disclosure. The operations of method 2000 may be implemented by a base station 105 or its components as described herein. For example, the operations of method 2000 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit a first DRX configuration associated with a first DRX operation for CA communications with a UE over a primary group of CCs. The operations of 2005 may be performed according to the methods described herein. In some examples, aspects of the operations of 2005 may be performed by a first DRX configuration component as described with reference to FIGS. 10 through 13.

At 2010, the base station may transmit a second DRX configuration associated with a second DRX operation for CA communications with the UE over a secondary group of CCs. The operations of 2010 may be performed according to the methods described herein. In some examples, aspects of the operations of 2010 may be performed by a second DRX configuration component as described with reference to FIGS. 10 through 13.

At 2015, the base station may transmit, via higher layer signaling, an indication of the CCs to be included the primary group, the CCs to be included the secondary group, or a combination thereof. The operations of 2015 may be performed according to the methods described herein. In some examples, aspects of the operations of 2015 may be performed by a CC configuration indicator as described with reference to FIGS. 10 through 13.

At 2020, the base station may operate in the first DRX operation and in the second DRX operation in accordance with a DRX coupling rule by which a first active state of the first DRX operation is determined based on a second active state of the second DRX operation, the second active state is determined based on the first active state, or both. The operations of 2020 may be performed according to the methods described herein. In some examples, aspects of the operations of 2020 may be performed by a multiple DRX operation component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a first discontinuous reception configuration associated with a first discontinuous reception operation for carrier aggregation communications with a base station over a primary group of component carriers; receiving a second discontinuous reception configuration associated with a second discontinuous reception operation for the carrier aggregation communications with the base station over a secondary group of component carriers; and operating the UE in the first discontinuous reception operation and in the second discontinuous reception operation in accordance with a discontinuous reception coupling rule by which a first active state of the first discontinuous reception operation is determined based at least in part on a second active state of the second discontinuous reception operation, the second active state is determined based at least in part on the first active state, or both.

Aspect 2: The method of aspect 1, further comprising: receiving, from the base station on one or more component carriers of the secondary group, a downlink signal during the second active state of the second discontinuous reception operation; and determining to start or restart a first inactivity timer for the primary group and a second inactivity timer for the secondary group based at least in part on receiving the downlink signal on the one or more component carriers of the secondary group in accordance with the discontinuous reception coupling rule.

Aspect 3: The method of aspect 2, wherein the downlink signal comprises a physical downlink control channel that indicates a new data transmission over a downlink or uplink shared channel.

Aspect 4: The method of any of aspects 1 through 3, further comprising: receiving, from the base station on one or more component carriers of the primary group, a downlink signal during the first active state of the first discontinuous reception operation; and determining to start or restart a first inactivity timer for the primary group based at least in part on receiving the downlink signal on the one or more component carriers of the primary group, wherein a second inactivity timer for the secondary group is not started or restarted after the downlink signal is received on the one or more component carriers of the primary group.

Aspect 5: The method of aspect 4, wherein the downlink signal comprises a physical downlink control channel that indicates a new data transmission over a downlink or uplink shared channel.

Aspect 6: The method of any of aspects 1 through 5, wherein the discontinuous reception coupling rule comprises: determining that a timer associated with the first active state, the second active state, or both is running for each of the primary group and the secondary group, wherein the first active state is maintained based at least in part on the timer running for each of the primary group and the secondary group.

Aspect 7: The method of aspect 6, further comprising: determining that the first active state is maintained based at least in part on the timer for the second active state is running, wherein the timer for the first active state is not running at a same instance as the timer for the second active state is running; refraining from monitoring for a downlink signal on the primary group based at least in part on the determination that the first active state is maintained based at least in part on the timer for the second active state is running while the timer for the first active state is not running; and transmitting an uplink signal on the primary group based at least in part on the determination that the first active state is maintained based at least in part on the timer for the second active state is running while the timer for the first active state is not running.

Aspect 8: The method of any of aspects 6 through 7, wherein the timer associated with the first active state, the second active state, or both comprises an on duration timer, an inactivity timer, a downlink retransmission timer, an uplink retransmission timer, a contention resolution timer, or a combination thereof.

Aspect 9: The method of any of aspects 1 through 8, further comprising: transmitting, to the base station, a scheduling request in an uplink control channel; and determining to maintain the first active state during a pending duration for the scheduling request, the pending duration comprising a duration where the UE is waiting for a downlink control channel from the base station in response to the scheduling request.

Aspect 10: The method of aspect 9, wherein the scheduling request is transmitted on one or more component carriers of the primary group, one or more component carriers of the secondary group, or a combination thereof.

Aspect 11: The method of any of aspects 1 through 10, further comprising: determining a downlink control channel indicating a transmission addressed to a cell radio network temporary identifier of a media access control entity of the UE has not been received on the component carriers of the primary group or the secondary group, wherein the first active state is maintained based at least in part on the downlink control channel not being received.

Aspect 12: The method of aspect 11, wherein the downlink control channel is expected to be received after receiving a random access response message as part of a random access procedure.

Aspect 13: The method of any of aspects 1 through 12, further comprising: determining the first active state of the first discontinuous reception operation has expired; and stopping the second active state of the second discontinuous reception operation based at least in part on the first active state expiring.

Aspect 14: The method of any of aspects 1 through 13, further comprising: determining the first discontinuous reception configuration, the second discontinuous reception configuration, or both comprise discontinuous reception short cycles for the first discontinuous reception operation, the second discontinuous reception operation, or both.

Aspect 15: The method of aspect 14, wherein the first active state for the first discontinuous reception operation associated with the discontinuous reception short cycles is independent of the second active state for the second discontinuous reception operation associated with the discontinuous reception short cycles.

Aspect 16: The method of any of aspects 14 through 15, wherein a configuration of discontinuous reception short cycles for the second discontinuous reception operation is ignored or prohibited.

Aspect 17: The method of any of aspects 1 through 16, wherein the first discontinuous reception configuration, the second discontinuous reception configuration, or both are received via higher layer signaling.

Aspect 18: The method of any of aspects 1 through 17, further comprising: receiving, via higher layer signaling, an indication of the component carriers to be included the primary group, the component carriers to be included the secondary group, or a combination thereof.

Aspect 19: The method of any of aspects 1 through 18, wherein the primary group comprises a primary discontinuous reception group, and the secondary group comprises a secondary discontinuous reception group.

Aspect 20: The method of any of aspects 1 through 19, wherein the first discontinuous reception configuration, the second discontinuous reception configuration, or both comprise a connected mode discontinuous reception configuration defined per media access control entity across the component carriers of the primary group and the component carriers of the secondary group for the carrier aggregation communications.

Aspect 21: The method of any of aspects 1 through 20, wherein the component carriers of the primary group and the component carriers of the secondary group are in a same or different frequency range, have a same or different numerology, or a combination thereof.

Aspect 22: A method for wireless communications at a base station, comprising: transmitting a first discontinuous reception configuration associated with a first discontinuous reception operation for carrier aggregation communications with a UE over a primary group of component carriers; transmitting a second discontinuous reception configuration associated with a second discontinuous reception operation for carrier aggregation communications with the UE over a secondary group of component carriers; and operating the base station in the first discontinuous reception operation and in the second discontinuous reception operation in accordance with a discontinuous reception coupling rule by which a first active state of the first discontinuous reception operation is determined based at least in part on a second active state of the second discontinuous reception operation, the second active state is determined based at least in part on the first active state, or both.

Aspect 23: The method of aspect 22, further comprising: transmitting, to the UE on one or more component carriers of the secondary group, a downlink signal during the second active state of the second discontinuous reception operation; and determining to start or restart a first inactivity timer for the primary group and a second inactivity timer for the secondary group based at least in part on transmitting the downlink signal on the one or more component carriers of the secondary group in accordance with the discontinuous reception coupling rule.

Aspect 24: The method of aspect 23, wherein the downlink signal comprises a physical downlink control channel that indicates a new data transmission over a downlink or uplink shared channel.

Aspect 25: The method of any of aspects 22 through 24, further comprising: transmitting, to the UE on one or more component carriers of the primary group, a downlink signal during the first active state of the first discontinuous reception operation; and determining to start or restart a first inactivity timer for the primary group based at least in part on transmitting the downlink signal on the one or more component carriers of the primary group, wherein a second inactivity timer for the secondary group is not started or restarted after the downlink signal is received on the one or more component carriers of the primary group.

Aspect 26: The method of aspect 25, wherein the downlink signal comprises a physical downlink control channel that indicates a new data transmission over a downlink or uplink shared channel.

Aspect 27: The method of any of aspects 22 through 26, wherein the discontinuous reception coupling rule comprises: determining that a timer associated with the first active state, the second active state, or both is running for each of the primary group and the secondary group, wherein the first active state is maintained based at least in part on the timer running for each of the primary group and the secondary group.

Aspect 28: The method of aspect 27, wherein the timer associated with the first active state, the second active state, or both comprises an on duration timer, an inactivity timer, a downlink retransmission timer, an uplink retransmission timer, a contention resolution timer, or a combination thereof.

Aspect 29: The method of any of aspects 22 through 28, further comprising: receiving, from the UE, a scheduling request in an uplink control channel; and determining to maintain the first active state during a pending duration for the scheduling request, the pending duration comprising a duration where the UE is waiting for a downlink control channel from the base station in response to the scheduling request.

Aspect 30: The method of aspect 29, wherein the scheduling request is received on one or more component carriers of the primary group, one or more component carriers of the secondary group, or a combination thereof.

Aspect 31: The method of any of aspects 22 through 30, further comprising: refraining from transmitting a downlink control channel indicating a transmission addressed to a cell radio network temporary identifier of a media access control entity of the UE, wherein the first active state is maintained based at least in part on the downlink control channel not being transmitted.

Aspect 32: The method of aspect 31, wherein the downlink control channel is expected to be transmitted after receiving a random access response message as part of a random access procedure.

Aspect 33: The method of any of aspects 22 through 32, further comprising: determining the first active state of the first discontinuous reception operation has expired; and stopping the second active state of the second discontinuous reception operation based at least in part on the first active state expiring.

Aspect 34: The method of any of aspects 22 through 33, further comprising: determining the first discontinuous reception configuration, the second discontinuous reception configuration, or both comprise discontinuous reception short cycles for the first discontinuous reception operation, the second discontinuous reception operation, or both.

Aspect 35: The method of aspect 34, wherein the first active state for the first discontinuous reception operation associated with the discontinuous reception short cycles is independent of the second active state for the second discontinuous reception operation associated with the discontinuous reception short cycles.

Aspect 36: The method of any of aspects 34 through 35, wherein a configuration of discontinuous reception short cycles for the second discontinuous reception operation is ignored or prohibited.

Aspect 37: The method of any of aspects 22 through 36, wherein the first discontinuous reception configuration, the second discontinuous reception configuration, or both are transmitted via higher layer signaling.

Aspect 38: The method of any of aspects 22 through 37, further comprising: transmitting, via higher layer signaling, an indication of the component carriers to be included the primary group, the component carriers to be included the secondary group, or a combination thereof.

Aspect 39: The method of any of aspects 22 through 38, wherein the primary group comprises a primary discontinuous reception group, and the secondary group comprises a secondary discontinuous reception group.

Aspect 40: The method of any of aspects 22 through 39, wherein the first discontinuous reception configuration, the second discontinuous reception configuration, or both comprise a connected mode discontinuous reception configuration defined per media access control entity across the component carriers of the primary group and the component carriers of the secondary group for the carrier aggregation communications.

Aspect 41: The method of any of aspects 22 through 40, wherein the component carriers of the primary group and the component carriers of the secondary group are in a same or different frequency range, have a same or different numerology, or a combination thereof.

Aspect 42: An apparatus for wireless communications at a UE, comprising a processor; memory coupled with the processor; and instructions stored in the memory and executable by the processor to cause the apparatus to perform a method of any of aspects 1 through 21.

Aspect 43: An apparatus for wireless communications at a UE, comprising at least one means for performing a method of any of aspects 1 through 21.

Aspect 44: A non-transitory computer-readable medium storing code for wireless communications at a UE, the code comprising instructions executable by a processor to perform a method of any of aspects 1 through 21.

Aspect 45: An apparatus for wireless communications at a base station, comprising a processor; memory coupled with the processor; and instructions stored in the memory and executable by the processor to cause the apparatus to perform a method of any of aspects 22 through 41.

Aspect 46: An apparatus for wireless communications at a base station, comprising at least one means for performing a method of any of aspects 22 through 41.

Aspect 47: A non-transitory computer-readable medium storing code for wireless communications at a base station, the code comprising instructions executable by a processor to perform a method of any of aspects 22 through 41.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving a first discontinuous reception configuration associated with a first discontinuous reception operation for carrier aggregation communications with a base station over a primary group of component carriers;
receiving a second discontinuous reception configuration associated with a second discontinuous reception operation for the carrier aggregation communications with the base station over a secondary group of component carriers; and operating the UE in the first discontinuous reception operation and in the second discontinuous reception operation in accordance with a discontinuous reception coupling rule by which a first active state of the first discontinuous reception operation is determined based at least in part on a second active state of the second discontinuous reception operation or the second active state is determined based at least in part on the first active state, wherein the discontinuous reception coupling rule includes that the second active state is not maintained unless the first active state is maintained contemporaneous with the second active state.

2. The method of claim 1, further comprising:
receiving, from the base station on one or more component carriers of the secondary group, a downlink signal during the second active state of the second discontinuous reception operation; and
determining to start or restart a first inactivity timer for the primary group and a second inactivity timer for the secondary group based at least in part on receiving the downlink signal on the one or more component carriers of the secondary group in accordance with the discontinuous reception coupling rule.

3. The method of claim 2, wherein the downlink signal comprises a physical downlink control channel that indicates a new data transmission over a downlink or uplink shared channel.

4. The method of claim 1, further comprising:
receiving, from the base station on one or more component carriers of the primary group, a downlink signal during the first active state of the first discontinuous reception operation; and
determining to start or restart a first inactivity timer for the primary group based at least in part on receiving the downlink signal on the one or more component carriers of the primary group, wherein a second inactivity timer for the secondary group is not started or restarted after the downlink signal is received on the one or more component carriers of the primary group.

5. The method of claim 4, wherein the downlink signal comprises a physical downlink control channel that indicates a new data transmission over a downlink or uplink shared channel.

6. The method of claim 1, wherein the discontinuous reception coupling rule comprises:
determining that a timer associated with the first active state or the second active state is running for each of the primary group and the secondary group, wherein the first active state is maintained based at least in part on the timer running for each of the primary group and the secondary group.

7. The method of claim 6, further comprising:
determining that the first active state is maintained based at least in part on the timer for the second active state is running, wherein the timer for the first active state is not running at a same instance as the timer for the second active state is running;
refraining from monitoring for a downlink signal on the primary group based at least in part on the determination that the first active state is maintained based at least in part on the timer for the second active state is running while the timer for the first active state is not running; and
transmitting an uplink signal on the primary group based at least in part on the determination that the first active state is maintained based at least in part on the timer for the second active state is running while the timer for the first active state is not running.

8. The method of claim 6, wherein the timer associated with the first active state or the second active state comprises an on duration timer, an inactivity timer, a downlink retransmission timer, an uplink retransmission timer, or a contention resolution timer.

9. The method of claim 1, further comprising:
transmitting, to the base station, a scheduling request in an uplink control channel; and
determining to maintain the first active state during a pending duration for the scheduling request, the pending duration comprising a duration where the UE is waiting for a downlink control channel from the base station in response to the scheduling request.

10. The method of claim 9, wherein the scheduling request is transmitted on one or more component carriers of the primary group, one or more component carriers of the secondary group, or a combination thereof.

11. The method of claim 1, further comprising:
determining a downlink control channel indicating a transmission addressed to a cell radio network temporary identifier of a media access control entity of the UE has not been received on one or more component carriers of the primary group or the secondary group, wherein the first active state is maintained based at least in part on the downlink control channel not being received.

12. The method of claim 11, wherein the downlink control channel is expected to be received after receiving a random access response message as part of a random access procedure.

13. The method of claim 1, further comprising:
determining the first active state of the first discontinuous reception operation has expired; and
stopping the second active state of the second discontinuous reception operation based at least in part on the first active state expiring.

14. The method of claim 1, further comprising:
determining the first discontinuous reception configuration or the second discontinuous reception configuration comprise discontinuous reception short cycles for the first discontinuous reception operation or the second discontinuous reception operation.

15. The method of claim 14, wherein the first active state for the first discontinuous reception operation associated with the discontinuous reception short cycles is independent of the second active state for the second discontinuous reception operation associated with the discontinuous reception short cycles.

16. The method of claim 14, wherein a configuration of discontinuous reception short cycles for the second discontinuous reception operation is ignored or prohibited.

17. The method of claim 1, wherein the first discontinuous reception configuration or the second discontinuous reception configuration are received via higher layer signaling.

18. The method of claim 1, further comprising:
receiving, via higher layer signaling, an indication of one or more component carriers to be included the primary group, the one or more component carriers to be included the secondary group, or a combination thereof.

19. The method of claim 1, wherein the primary group comprises a primary discontinuous reception group, and the secondary group comprises a secondary discontinuous reception group.

20. The method of claim 1, wherein the first discontinuous reception configuration or the second discontinuous reception configuration comprise a connected mode discontinuous reception configuration defined per media access control entity across one or more component carriers of the primary group and the one or more component carriers of the secondary group for the carrier aggregation communications.

21. The method of claim 1, wherein one or more component carriers of the primary group and the one or more component carriers of the secondary group are in a same or different frequency range, or have a same or different numerology.

22. An apparatus for wireless communications at a user equipment (UE), comprising:
a processor,
memory coupled with the processor; and
instructions stored in the memory and executable by the processor to cause the apparatus to:
receive a first discontinuous reception configuration associated with a first discontinuous reception operation for carrier aggregation communications with a base station over a primary group of component carriers;
receive a second discontinuous reception configuration associated with a second discontinuous reception operation for the carrier aggregation communications with the base station over a secondary group of component carriers; and
operate the UE in the first discontinuous reception operation and in the second discontinuous reception operation in accordance with a discontinuous reception coupling rule by which a first active state of the first discontinuous reception operation is determined based at least in part on a second active state of the second discontinuous reception operation or the second active state is determined based at least in part on the first active state, wherein the discontinuous reception coupling rule includes that the second active state is not maintained unless the first active state is maintained contemporaneous with the second active state.

23. The apparatus of claim 22, wherein the instructions are further executable by the processor to cause the apparatus to:
receive, from the base station on one or more component carriers of the secondary group, a downlink signal during the second active state of the second discontinuous reception operation; and
determine to start or restart a first inactivity timer for the primary group and a second inactivity timer for the secondary group based at least in part on receiving the downlink signal on the one or more component carriers of the secondary group in accordance with the discontinuous reception coupling rule.

24. The apparatus of claim 23, wherein the downlink signal comprises a physical downlink control channel that indicates a new data transmission over a downlink or uplink shared channel.

25. The apparatus of claim 22, wherein the instructions are further executable by the processor to cause the apparatus to:
receive, from the base station on one or more component carriers of the primary group, a downlink signal during the first active state of the first discontinuous reception operation; and
determine to start or restart a first inactivity timer for the primary group based at least in part on receiving the downlink signal on the one or more component carriers of the primary group, wherein a second inactivity timer for the secondary group is not started or restarted after the downlink signal is received on the one or more component carriers of the primary group.

26. The apparatus of claim 25, wherein the downlink signal comprises a physical downlink control channel that indicates a new data transmission over a downlink or uplink shared channel.

27. The apparatus of claim 22, wherein the discontinuous reception coupling rule comprises:
determine that a timer associated with the first active state or the second active state is running for each of the primary group and the secondary group, wherein the first active state is maintained based at least in part on the timer running for each of the primary group and the secondary group.

28. The apparatus of claim 27, wherein the instructions are further executable by the processor to cause the apparatus to:
determine that the first active state is maintained based at least in part on the timer for the second active state is running, wherein the timer for the first active state is not running at a same instance as the timer for the second active state is running;
refrain from monitoring for a downlink signal on the primary group based at least in part on the determination that the first active state is maintained based at least in part on the timer for the second active state is running while the timer for the first active state is not running; and
transmit an uplink signal on the primary group based at least in part on the determination that the first active state is maintained based at least in part on the timer for the second active state is running while the timer for the first active state is not running.

29. An apparatus for wireless communications at a user equipment (UE), comprising:
means for receiving a first discontinuous reception configuration associated with a first discontinuous reception operation for carrier aggregation communications with a base station over a primary group of component carriers;
means for receiving a second discontinuous reception configuration associated with a second discontinuous reception operation for the carrier aggregation communications with the base station over a secondary group of component carriers; and
means for operating the UE in the first discontinuous reception operation and in the second discontinuous reception operation in accordance with a discontinuous reception coupling rule by which a first active state of the first discontinuous reception operation is determined based at least in part on a second active state of the second discontinuous reception operation or the second active state is determined based at least in part on the first active state, wherein the discontinuous reception coupling rule includes that the second active state is not maintained unless the first active state is maintained contemporaneous with the second active state.

30. A non-transitory computer-readable medium storing code for wireless communications at a user equipment (UE), the code comprising instructions executable by a processor to:
receive a first discontinuous reception configuration associated with a first discontinuous reception operation for carrier aggregation communications with a base station over a primary group of component carriers;

receive a second discontinuous reception configuration associated with a second discontinuous reception operation for the carrier aggregation communications with the base station over a secondary group of component carriers; and operate the UE in the first discontinuous reception operation and in the second discontinuous reception operation in accordance with a discontinuous reception coupling rule by which a first active state of the first discontinuous reception operation is determined based at least in part on a second active state of the second discontinuous reception operation or the second active state is determined based at least in part on the first active state, wherein the discontinuous reception coupling rule includes that the second active state is not maintained unless the first active state is maintained contemporaneous with the second active state.

* * * * *